US006633339B1

(12) United States Patent
Goto et al.

(10) Patent No.: US 6,633,339 B1
(45) Date of Patent: Oct. 14, 2003

(54) METHOD AND DEVICE FOR SEAMLESS-DECODING VIDEO STREAM INCLUDING STREAMS HAVING DIFFERENT FRAME RATES

(75) Inventors: Shoichi Goto, Ibaraki (JP); Shintaro Nakatani, Kanazawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/701,470

(22) PCT Filed: Mar. 29, 2000

(86) PCT No.: PCT/JP00/01929

§ 371 (c)(1),
(2), (4) Date: Nov. 29, 2000

(87) PCT Pub. No.: WO00/60872

PCT Pub. Date: Oct. 12, 2000

(30) Foreign Application Priority Data

Mar. 31, 1999 (JP) ............................................... 11-93958

(51) Int. Cl.[7] ................................................ H04N 7/12
(52) U.S. Cl. ................ 348/425.4; 375/240.28
(58) Field of Search ............................ 348/158, 425.4, 348/441, 459, 470, 607, 385.1, 388.1, 512; 375/240.01, 240.26, 240.28

(56) References Cited

U.S. PATENT DOCUMENTS

| | | | | |
|---|---|---|---|---|
| 5,661,518 A | * | 8/1997 | Palm et al. | .................... 348/42 |
| 5,828,788 A | * | 10/1998 | Chiang et al. | ............... 382/239 |
| 6,075,576 A | * | 6/2000 | Tan et al. | ................. 348/845.3 |
| 6,246,720 B1 | * | 6/2001 | Kutner et al. | .......... 375/240.25 |
| 6,434,197 B1 | * | 8/2002 | Wang et al. | ............ 375/240.29 |

FOREIGN PATENT DOCUMENTS

| | | |
|---|---|---|
| JP | 11-41606 | 2/1999 |
| JP | 11-69350 | 3/1999 |

* cited by examiner

*Primary Examiner*—Victor R. Kostak
(74) *Attorney, Agent, or Firm*—Wenderoth, Lind & Ponack, L.L.P.

(57) ABSTRACT

A decoding apparatus (VDA) for decoding a mixed video stream (STv) of a plurality of streams (interlace scheme, progressive scheme) of different frame rates in predetermined decode timing (Vmc) for seamless playback, the apparatus including a stream analyzer (Ddv, 2) for extracting each frame rate before the plurality of streams (IS, PS) are decoded and a video decode controller (CDV) for determining the timing (Vmc) for decoding a slice layer (SL) of the video stream (STv) based on the extracted frame rate. The video stream (STv) is decoded in the determined timing (Vmc). Even if the video stream (STv) is switched between the streams (IS, PS) of different frame rate, seamless playback can be carried out.

18 Claims, 28 Drawing Sheets

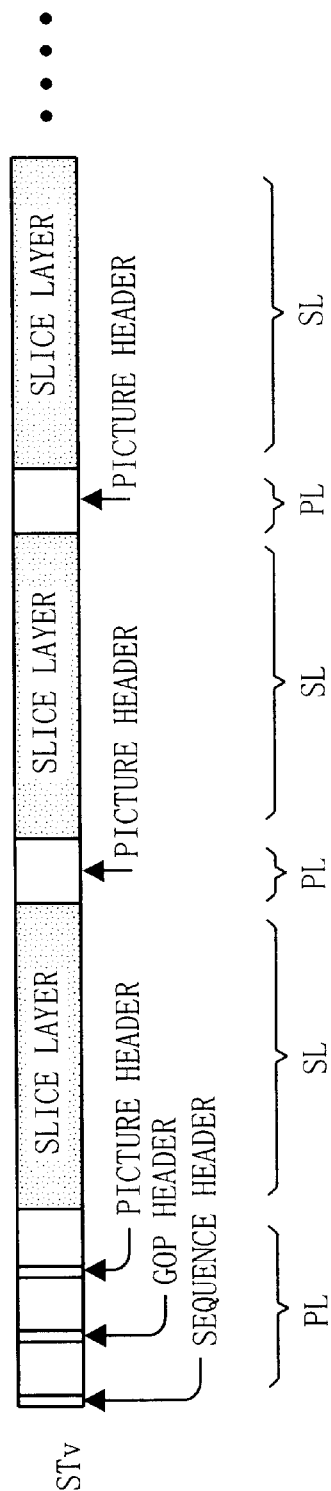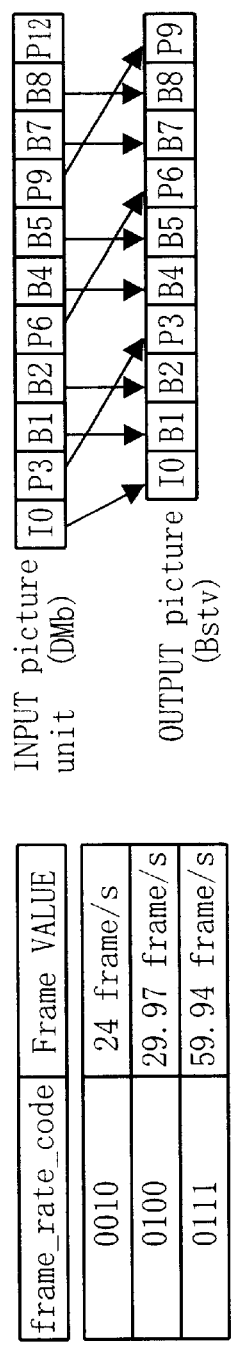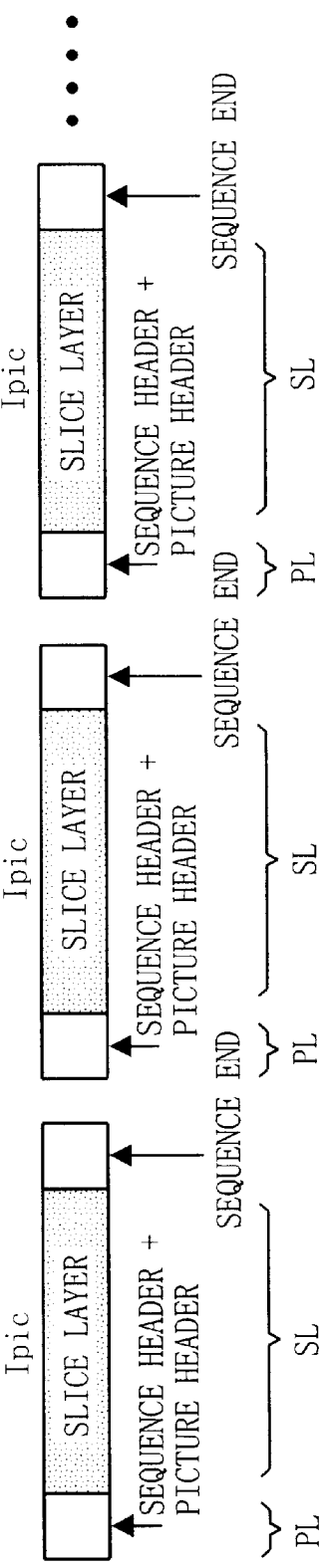

F I G. 7
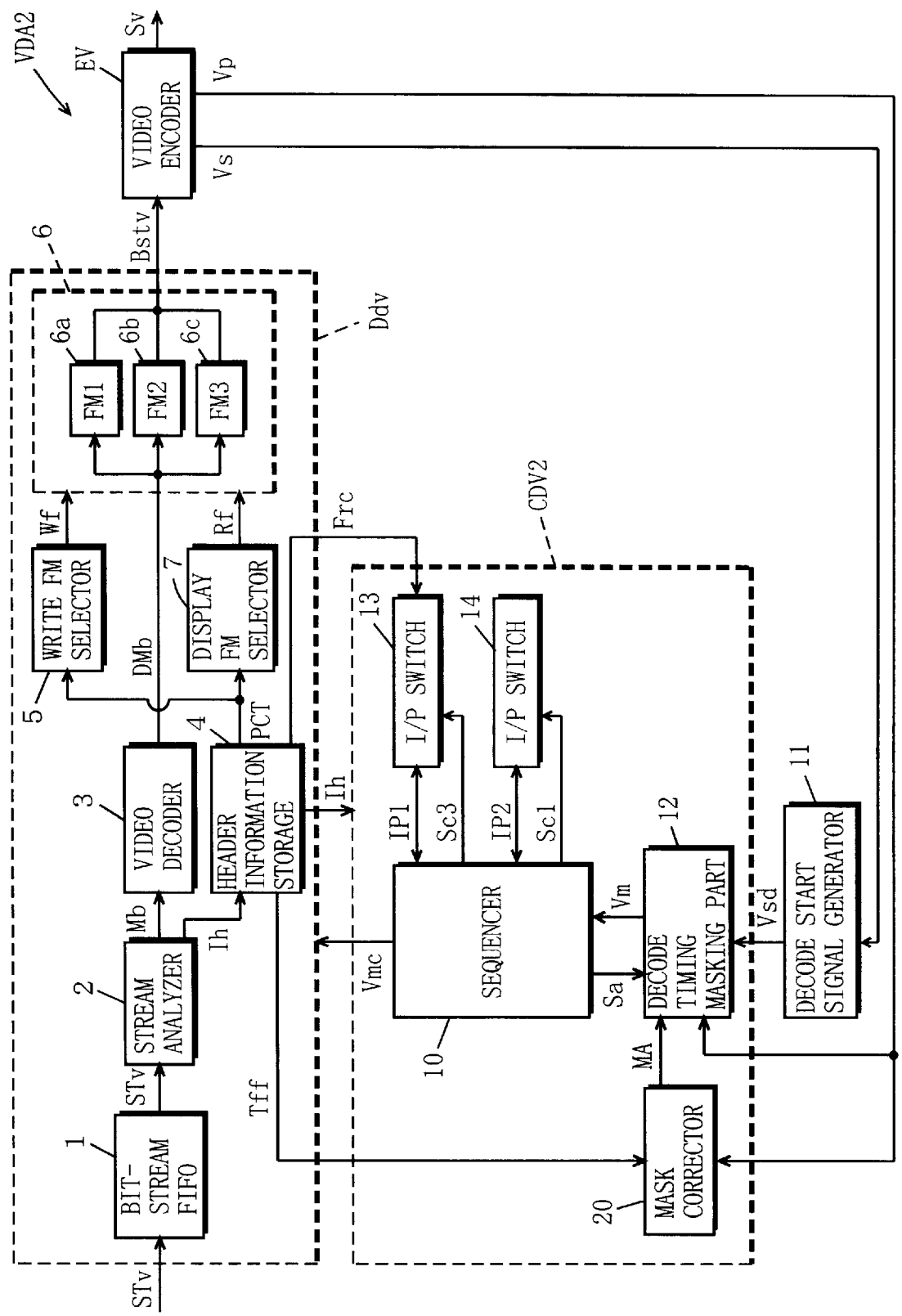

METHOD AND DEVICE FOR SEAMLESS-DECODING VIDEO STREAM INCLUDING STREAMS HAVING DIFFERENT FRAME RATES

TECHNICAL FIELD

This invention relates to decoding apparatuses for seamlessly playing back a video stream comprised of streams having different frame rates and, more specifically, to an apparatus for decoding a digital stream which is a mixture of interlace and progressive streams.

BACKGROUND ART

Satellite digital broadcasting first started in the United State in 1994, then became widespread in Japan and across Europe in 1996, and is now in full-fledged into practical use. Unlike conventional analog broadcasting, digital broadcasting can provide various services, such as high-definition, multi-channel data broadcasting. To achieve such services at broadcasters, great innovations have been introduced to broadcast station systems and receivers. Such new services under consideration include high-definition broadcasting, which is a service inherent in broadcasters, and data broadcasting, which is a new service. By the latter half of 2000, BS digital broadcasting is scheduled to be put in use in Japan.

As one approach toward high-definition, adoption of a progressive scheme prescribed in number 7 of Departmental ordinance of Ministry of Posts and Telecommunications has been considered in national CS (satellite) digital broadcasting. In the progressive scheme, the amount of information is doubled compared with the conventional interlace scheme, and extremely high vertical resolution can be achieved. Moreover, in the progressive scheme, deterioration in image quality associated with interlace operation such as flicker is prevented, and video of high image quality can be achieved.

Most of the existing video contents are created in the interlace scheme. Not all of upcoming video contents will be created in the progressive scheme, but some of them coming early would be created in the interlace scheme, and then gradually many of them will be created in the progressive scheme. Moreover, once created in the interlace scheme, the video content would never be recreated in the progressive scheme unless there is any specific reason.

With such situation, at least for the time being, the broadcasting goes on mostly with the current interlace-scheme, scarcely with progressive-scheme. Such broadcasting is called mixed-scheme-composition, in which a stream in the interlace scheme (hereinafter, "interlace stream IS") and a stream in the progressive stream (hereinafter, "progressive stream PS") are mixed in the same program. The ratio of the mixed-scheme-composition will be decreased in the future, but will not disappear for a long while.

This mixed-scheme-composition not only applies to digital broadcasting, but also to equipment that handles MPEG streams such as DVD. That is, a situation is expected to occur where a mixed digital stream comprised of contents created in the interlace scheme and the progressive scheme is recorded on a single DVD and provided. When this DVD is played back, the same situation occurs as in the above-stated digital broadcasting of mixed-scheme-composition.

When the above digital stream broadcasting of mixed programming is viewed or the DVD with the mixed digital stream recorded thereon is played back, the decoding side should correctly support MPEG streams of different frame rates, such as those in the interlace scheme and in the progressive scheme. Otherwise, played-back images will be disrupted at the time of switching of the interlace scheme/progressive scheme, as will be described below with reference to FIGS. 27 and 28. In other words, played-back images are not displayed by a unit of frame or field, or displayed incompletely. This causes visually-perceivable discontinuity of screen progress, and makes a viewer feel uncomfortable.

The operation carried out in a conventional video apparatus for decoding the mixed stream changed from the interlace stream IS to the progressive stream PS is shown in FIG. 27. In the drawing, in image display periods (hereinafter abbreviated as "period" as required for convenience) T0 to T4, an interlace stream IS comprised of a P picture P9 (period T0), a B picture B7 (period T2), and a B picture B8 (period T4) is provided through a bit-stream FIFO to the video decoding apparatus.

Then, in image display periods T6 to T11, a progressive stream PS comprised of an I picture I0 (period T6), a P picture P3 (period T7), a B picture B1 (period T8), a B picture B2 (period T9), a P picture P6 (period T10), and a B picture B4 (period T11) is provided through the bit-stream FIFO to the video decoding apparatus. The operation of the video decoding apparatus in each period is described below.

Note that a suffix "P" added to each picture represents Predictive Picture, "I" represents Intra Picture, and "B" represents Bidirectionally Predictive Picture. A numeral that follows each of the suffixes P, I, and B indicates a display order of that picture.

Each picture data of the interlace stream IS included in the input stream is written in a specified frame memory FMn at the same time when decoding starts in synchronization with a corresponding decode start signal. The decoded picture data written in the frame memory FMn is read therefrom in predetermined timing. In synchronization with a vertical synchronization signal (while a vertical signal is at high level), a bottom field or top field is displayed based on a display parity.

Note that, the P picture and I picture are written in the frame memory FMn, and then read therefrom for display after passing a predetermined time, while the B picture is written in the frame memory FMn and read therefrom at the same time.

Also, similarly to the picture data of the interlace stream IS, picture data of the progressive stream PS included in the input stream is decoded, written in the frame memory FMn, and read therefrom for display. However, what is displayed is not a field but a frame, irrespectively of the display parity. The operation from decoding to displaying the input stream in each image display period is specifically described below.

In the period T0, decoded data of a P picture P6 and a B picture (not shown) included in the interlace stream IS before the period T0 are written in a frame memory FM2 and a frame memory FM3, respectively. The P picture P9 is sequentially decoded while being inputted, and written in a frame memory FM1.

Then, in synchronization with the vertical synchronization signal for display, and further based on the display parity, the decoded data of the P picture P6 is read from the frame memory FM2, and the bottom field image display starts based on the display parity. Note that, in a conventional example shown herein, the interlace stream is displayed with its bottom field first.

In the period T1, after the bottom field image display of the P picture P6 started in the period T0 ends, the top field image display of the P picture P6 starts based on the display parity.

In the period T2, the B picture B7 is sequentially decoded while being inputted, written in the frame memory FM3, and then further read and the bottom field image display starts based on the display parity.

In the period T3, after the bottom field image display of the B picture B7 started in the period T2 ends, the top field image display of the B picture B7 starts based on the display parity.

In the period T4, the B. picture B8 is sequentially decoded while being inputted, written in the frame memory FM3, and then further read and the bottom field image display starts based on the display parity.

In the period T5, after the bottom field image display of the B picture B8 started in the period T4 ends, the top field image display of the B picture B8 starts based on the display parity.

In the period T6, the I picture I0 of the progressive stream PS is sequentially decoded while being inputted, and written in the frame memory FM2. Simultaneously, the decoded data of the P picture P9 of the interlace stream IS is read from the frame memory FM1, and the bottom field image display starts based on the display parity.

In the period T7, a P picture P3 of the progressive stream PS is sequentially decoded while being inputted, and written in the frame memory FM1. Note that, from the frame memory FM2, the I picture I0 of the progressive stream PS is read, and a frame image thereof is displayed. Therefore, the top field image of the P picture P9 read from the frame memory FM1 in the period T6 is not displayed. As such, instead of the top field image of the P picture P9, the frame image display of the I picture I0 of the progressive stream PS starts, which causes image distortion (discontinuity) that makes the viewer feel uncomfortable.

In the period T8, a B picture B1 of the progressive stream PS is sequentially decoded while being inputted, and written in the frame memory FM3. Simultaneously, the B picture B1 is read, and the frame image thereof is displayed. In this way, the image of the P picture P9, which is the last display data of the interlace stream IS, is not completely displayed, and the image display is switched to the progressive stream PS.

In the period T9, a B picture B2 is sequentially decoded while being inputted, and written in the frame memory FM2. Simultaneously, the B picture B2 is read, and the frame image thereof is displayed.

In the period T10, a P picture P6 is sequentially decoded while being inputted, and written in the frame memory FM2. Further, the decoded data of the P picture P3 is read from the frame memory FM1, and the frame image thereof is displayed.

In the period T11, a B picture B4 is sequentially decoded while being inputted, and written in the frame memory FM3. Simultaneously, the B picture B4 is read, and the frame image thereof is displayed.

As such, when broadcasting is switched from the interlace stream IS to the progressive stream PS in the image display period T5, the next image of the progressive stream PS is displayed in the image display periods T6 to T7 while the top field image of the P picture P9 of the interlace stream IS is left not being displayed.

Next, the operation carried out in the conventional video decoding apparatus (not shown) for decoding the mixed stream changed from the progressive stream PS to the interlace stream IS is shown in FIG. 28. In the drawing, in image display periods T6 to T11, the progressive stream PS comprised of a P picture P6 (period T6), a B picture B4 (period T7), a B picture B5 (period T8), a P picture P9 (period T9), a B picture B7 (period T10), and a B picture B8 (period T11) is provided through the bit-stream FIFO to the video decoding apparatus.

In image display periods T0 to T4, an interlace stream IS comprised of an I picture I0 (period T0), a P picture P3 (period T2), and a B picture B1 (period T4) is provided through the bit-stream FIFO to the video decoding apparatus. The operation of the video decoding apparatus in each period is described below.

In the period T6, the P picture P6 of the progressive stream PS is sequentially decoded while being inputted, and written in the frame memory FM2. Simultaneously, the decoded data of the preceding P picture P3 of the progressive stream PS is read from the frame memory FM1, and the image display thereof starts.

In the period T7, the B picture B4 is sequentially decoded while being inputted, and written in the frame memory FM3. Simultaneously, the B picture B4 is read, and the frame image thereof is displayed.

In the period T8, the B picture B5 is sequentially decoded while being inputted, and written in the frame memory FM3. Simultaneously, the B picture B5 is read, and the frame image thereof is displayed.

In the period T9, the P picture P9 is sequentially decoded while being inputted, and written in the frame memory FM1. Furthermore, the decoded data of the P picture P6 is simultaneously read from the frame memory FM2, and the frame image of the P picture P6 is displayed.

In the period T10, the B picture B7 is sequentially decoded while being inputted, and written in the frame memory FM3. Simultaneously, the B picture B7 is read, and the frame image thereof is displayed.

In the period T11, the B picture B8 is sequentially decoded while being inputted, and written in the frame memory FM3. Simultaneously, the B picture B8 is read, and the frame image thereof is displayed.

In the period T0, the I picture I0 of the interlace stream IS is written in the frame memory FM2 while being inputted. Furthermore, the decoded data of the P picture P9 of the progressive stream PS is simultaneously read, and the frame image thereof is displayed.

In the period T1, the frame image of the P picture P9 of the progressive stream PS displayed in the period T0 is still displayed.

In the period T2, the P picture P3 of the interlace stream IS is sequentially decoded while being inputted, and written in the frame memory FM1. Furthermore, the I picture I0 of the interlace stream IS is simultaneously read from the frame memory FM2, and the bottom field image thereof is displayed based on the display parity.

In the period T3, after display of the bottom field image of the I picture I0 started in the period T2 ends, the top field image of the I picture I0 is displayed based on the display parity.

In the period T4, the B picture B1 of the interlace stream IS is sequentially decoded while being inputted, and written in the frame memory FM3. Simultaneously, the B picture B1 is read, and the bottom field image thereof is displayed based on the display parity.

In the period T5, after the bottom field image display of the B picture B1 started in the period T4 ends, the top field image of the B picture B1 is displayed based on the display parity.

As stated above, when broadcasting is changed from the progressive stream PS to the interlace stream IS between the image display periods T11 and T0, bottom_field is displayed in the image display periods T2 to T3 even if top_field of the interlace stream IS has to be first displayed. Displaying (Outputting from the frame memory FMn) top_field and bottom_field in reversed order causes a shift in time relation between field-basis images, and makes the viewer feel awkward to watch the images.

This is because, if an image whose top_field is supposed to be displayed first with respect to a time axis is displayed with its bottom_field first displayed, the image is displayed against the time axis. Therefore, when the video stream STv is changed from the progressive stream PS to the interlace stream IS, it is of the utmost importance to determine which of top_field and bottom_field is first displayed and to make the displayed field match the display parity.

Moreover, when the progressive stream PS is decoded in decode timing for the interlace stream IS, the amount of data becomes doubled compared with a case where the interlace stream IS is processed, and therefore overflow occurs. On the other hand, when the interlace-scheme stream is decoded in decode timing for the progressive stream PS, conversely, the amount of data becomes half compared with a case where the progressive stream PS is processed, and therefore underflow occurs. As a result, decoding fails is failed.

In the examples shown in FIGS. 27 and 28, a group of frame memories is structured by three frame memories, that is, the frame memories FM1 and FM2 for storing an I picture or P picture, and the frame memory FM3 for storing only a B picture, wherein each picture is stream image data. In the group of frame memories as structured above, storing, that is, writing, image data in each frame memory FMn (n=1, 2, 3) and reading the written image data from the frame memory FMn for display are synchronized to each other in timing.

In other words, while an I picture or P picture to be stored in the frame memory FM1 or FM2 (for example, to be stored in the frame memory FM1) is decoded, a picture that has been already decoded (stored in the frame memory FM2) is read for display. When a B picture stored in the frame memory FM3 is decoded, the B picture is read for display while being decoded.

For example, in the image display period T0 of FIG. 27, the P9 picture is decoded in the frame memory FM1, and therefore the P6 picture stored in the frame memory FM2 is displayed. In the image display period T2, the B7 picture is decoded in the frame memory FM3, and therefore the B7 picture is displayed. This is because the B picture is decoded with bidirectional prediction between frames and has references from the preceding and succeeding I picture and P picture, and therefore those reference pictures have to be held in the frame memories FM1 and FM2.

Moreover, in the input streams as shown in FIGS. 27 and 28, the B picture, which is decoded and displayed simultaneously, has to be controlled in decode timing with display progress speed. In other words, in some cases, the B picture is too large to be decoded within a cycle of the vertical synchronization signal (16.7 ms), thereby causing display disruption.

In view of the above, an object of the present invention is to provide a video decoding apparatus that analyzes each frame rate and a display parity (a parameter for determining which of top/bottom_field is displayed first) in a stream comprised of plurality of video data of different frame rates and controls timing of starting video decoding, thereby achieving seamless playback without screen display disruption.

DISCLOSURE OF THE INVENTION

The present invention has the following features to achieve the above object.

A first aspect of the present invention is directed to a decoding apparatus for decoding a video stream comprised of a plurality of streams of different frame rates in predetermined decode timing for seamless playback. The decoding apparatus in accordance with the first aspect of the present invention comprises a frame rate extracting unit for extracting each of the frame rates before decoding the plurality of streams, and a decode control unit for determining timing for decoding a slice layer of the video stream based on the extracted frame rate, wherein the seamless playback is possible by decoding the video stream in the determined decode timing even when the video stream is switched among streams of different frame rates.

As described above, in the first aspect, decoding timing is determined based on the frame rate of the stream extracted in advance before being decoded. Therefore, an appropriate process can be ready for the stream to be decoded.

According to a second aspect, further to the first aspect, the frame rate extracting unit analyzes the video stream based on the decode timing, and separates the video stream into header information and compressed data.

According to a third aspect, further to the second aspect, the decode control unit delays, based on the header information, a vertical synchronization signal defined by a display format of the video stream for a predetermined time according to each of the frame rates of the plurality of streams included in the video stream, and generates a decode timing signal for defining the decode timing.

According to a fourth aspect, further to the third aspect, the predetermined time is shorter than one cycle of the vertical synchronization signal.

According to a fifth aspect, further to the fourth aspect, the predetermined time is a half of one cycle of the vertical synchronization signal.

According to a sixth aspect, further to the first aspect, the decode unit decodes a slice layer of compressed data and then decodes a picture layer of a following picture.

As described above, in the sixth aspect, the picture layer of the picture to be decoded next is decoded. Thus, information for displaying that picture can be obtained, and the picture can be quickly displayed.

According to a seventh aspect, further to the third aspect, the decode control unit includes, for the video stream, a decode timing corrector for alternately masking the decode timing signal for an interlace stream, and outputting the decode timing signal as it is for a progressive stream.

According to an eighth aspect, further to the seventh aspect, the decode control unit masks the decode timing signal for completing display of the interlace stream when the video stream is changed from the interlace stream to the progressive stream.

According to a ninth aspect, further to the seventh aspect, the decode control unit prohibits masking of the decode timing signal, and decodes a first picture of the interlace stream that follows a last picture of the progressive stream when the video stream is changed from the progressive stream to the interlace stream.

According to a tenth aspect, further to the seventh aspect, the decode control unit sets a multi-level transition parameter indicating a transition of the video stream to a first predetermined value when the video stream (STv) is not changed while decoded, sets the transition parameter to a second predetermined value when the video stream is changed from the interlace stream to the progressive stream, that is, when frame rate code is changed from a value less than 7 to 7, sets the transition parameter to a third predetermined value when the video stream is changed from the progressive stream to the interlace stream, that is, frame rate code is changed from 7 to a value less than 7, and sets the transition parameter to the first predetermined value in next decode timing.

According to an eleventh aspect, further to the tenth aspect, the decode control unit masks top_field of the decode timing signal when the video stream is the interlace stream and video display is carried out sequentially from top_field in accordance with video display parity, and masks bottom field of the decode timing signal when video display is carried out sequentially from bottom field in accordance with the video display parity.

According to a twelfth aspect, further to the eleventh aspect, whether to mask top_field or bottom_field of the decode timing signal is defined by a binary mask signal parity mask.

According to a thirteenth aspect, further to the twelfth aspect, the decode control unit reverses parity_mask for parity correction when parity_mask is not equal to the video display parity and frame_rate_code is smaller than 7, and top_field_first is equal to the video display parity.

According to a fourteenth aspect, further to the seventh aspect, the decode control unit sets a binary initial parameter defining an initial state of the decode control unit to a first value.

According to a fifteenth aspect, further to the fourteenth aspect, when decoding starts, the decode control unit always decodes a first picture of a following stream in order of the picture layer, the slice layer, and then the picture layer when the initial state parameter indicates the first value.

According to a sixteenth aspect, further to the seventh aspect, when decoding starts, the decode control unit always executes a sleep process after setting the video stream to the progressive stream.

According to a seventeenth aspect, further to the seventh aspect, the decode control unit carries out frame rate correction at a time of a first transition of the video stream from a 24-frame interlace stream to either of a progressive stream or 30-frame interlace stream and at a time of a second transition of the video stream in reverse of the first transition. and sets a binary parameter defining parity of the stream from one value to another value for parity correction at a time of 3:2 pull-down.

According to an eighteenth aspect, further to the fifteenth aspect, the picture layer includes sequence_header, GOP_header, and Picture header, the slice layer includes a bit stream having slice_header and thereafter, and the picture layer and the slice layer forms one image.

According to a nineteenth aspect, further to the seventh aspect, the decode control unit ends decoding when detecting sequence_end at a tune of decoding the picture layer, and when detecting sequence end of the video stream (STv), decodes the picture layer, the slice layer, and then the picture layer, and then executes a sleep process.

According to a twentieth aspect, further to the fourteenth aspect, the decode control unit prohibits output image setting when the initial state parameter indicates the first value.

According to a twenty-first aspect, further to the seventh aspect, the decode control unit makes a previously-decoded I picture or P picture displayed at a time of underflow at which decoding in previous decode timing has been incomplete when another decode timing comes.

According to a twenty-second aspect, further to the seventeenth aspect, when underflow occurs at a B picture, the decode control unit decodes, a picture layer and a slice layer of a following I picture or P picture, and then a following picture layer, and then executes a sleep process.

BRIEF DESCRIPTION OF THE DRAWINGS

FIGS. 4(a)–4(d) are diagrams in assistance of explaining the structure of a video stream provided to the video stream seamless decoding apparatus shown in FIG. 1.

FIG. 7 is a block diagram showing a video stream seamless decoding apparatus according to a second embodiment of the present invention.

BEST MODE FOR CARRYING OUT THE INVENTION

The present invention is now described in detail referring to the attached drawings.

First Embodiment

First, with reference to FIGS. 1, 2, 3, and 4 a video stream seamless decoding apparatus according to a first embodiment of the present invention is described. As shown in a block diagram of FIG. 1, the video stream seamless decoding apparatus in a present example (hereinafter abbreviated as "video decoding apparatus VDA1") is mainly structured by a video decoding section Ddv for decoding a video stream STv, which is incoming MPEG data, and producing a digital video signal Bstv, a video encoder EV, a decode start signal generator 11, and a video decode controller CDV1.

The video decoding section Ddv is connected to an external digital video signal source (not shown) for receiving an input of the video stream STv. The structure of the video stream STv will be specifically described in detail later with reference to FIG. 4. The video decoding section Ddv performs various digital processing on the incoming video stream STv for decoding, and produces the digital video signal Bstv.

The video encoder EV outputs a vertical synchronization signal Vs and a parity signal Vp that are defined based on a display format to the video decode controller CDVL for displaying an image on a monitor. Furthermore, the video encoder EV is connected to the video decoding section Ddv, and on receiving an input of the digital video signal Bstv, encodes the digital video signal Bstv in timing determined by the vertical synchronization signal Vs and the parity signal Vp for outputting a video signal Sv complying with the display format. This video signal Sv is provided to a display device complying with the display format for image display.

The decode start signal generator 11 generates, based on the vertical synchronization signal Vs, inputted from the video encoder EV, a decode start signal Vsd for decoding the incoming video stream STv in timing that complies with the picture structure thereof. In this sense, the vertical synchronization signal Vs can be taken as a first vertical synchronization signal, while the decode start signal Vsd as a second vertical synchronization signal.

Figure 1:
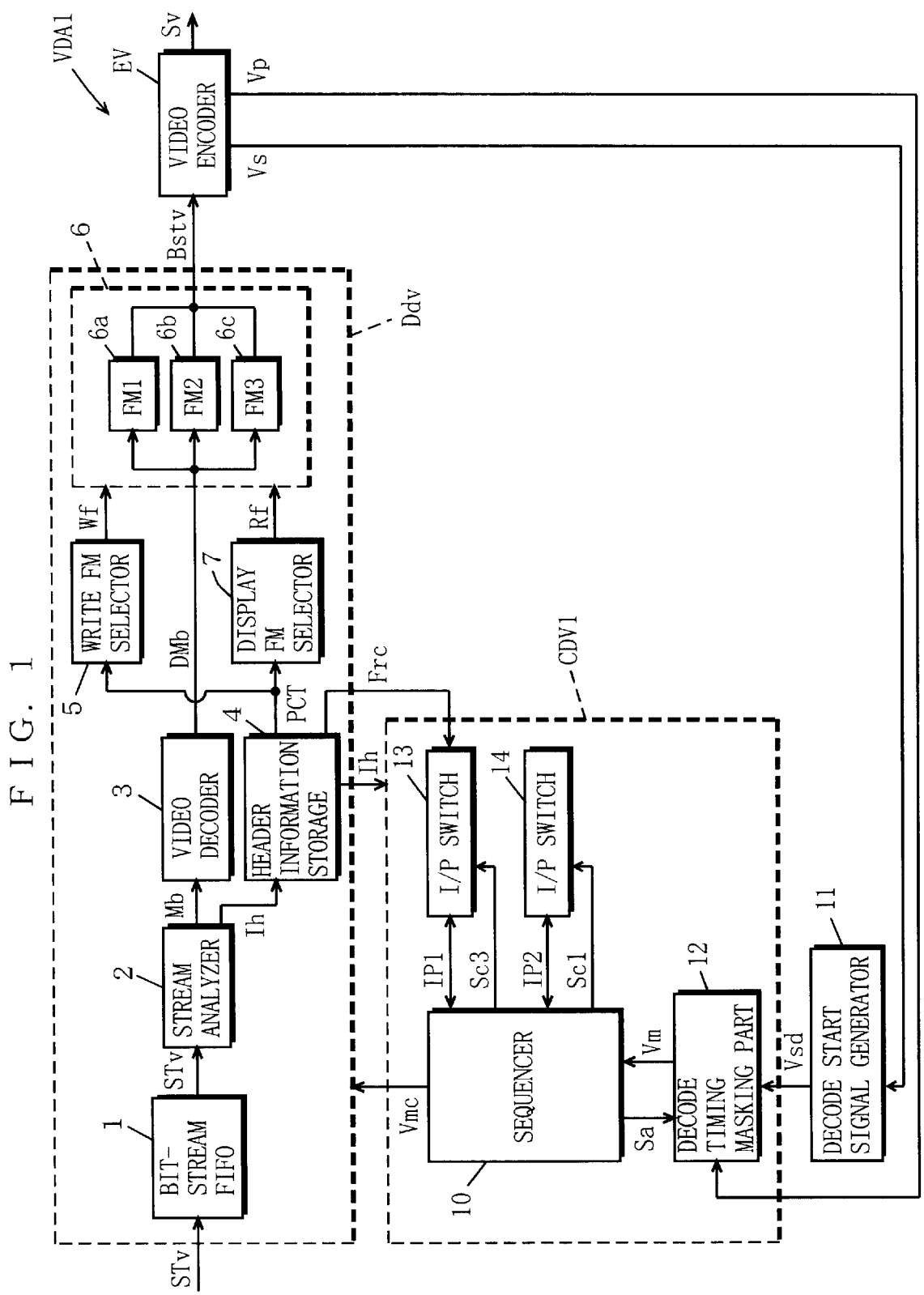
FIG. 1 is a block diagram showing the structure of a video stream seamless decoding apparatus according to a first embodiment of the present invention.

The video decode controller CDV1 is further connected to the video decoding section Ddv for receiving inputs of header information Ih extracted at the time of decoding the video stream STv and, among various data generated based on the header information Ih, frame_rate_code (denoted as "Frc" in FIG. 1). Then, based on the video synchronization signal Vs and the parity signal Vp provided by the video encoder EV and the header information and frame_rate_code provided by the video decoding section Ddv, the video decode controller CDV controls the operation of the whole video decoding section Ddv so that the video stream STv is correctly decoded according to its contents.

The video decoding section Ddv includes a bit-stream FIFO 1, a stream analyzer 2, a video decoder 3, a header information storage 4, a write frame memory selector 5 (denoted as "write FM selector 5" in FIG. 1), a group of frame memories 6, and a display frame memory selector 7 (denoted as "display FM selector" in FIG. 1). The bit-stream FIFO 1 temporarily holds the video stream STv provided by the external digital video signal source.

The stream analyzer 2 analyzes the video stream STv provided by the bit-stream FIFO 1 for extracting the header information Ih and MPEG compressed image data Mb.

The video decoder 3 decodes the compressed image data Mb provided by the stream analyzer 2 for generating decoded image data DMb for output to the write frame memory selector 5. On the other hand, the header information storage 4 stores the header information Ih provided by the stream analyzer 2. Then, the header information storage 4 outputs, among the header information Ih stored therein, a picture coding type PCT (that is, a parameter indicating that a picture is any one of P, I and B) to the write frame memory selector 5 and the display frame memory selector 7 in response to requests therefrom. The header information storage 4 also outputs frame_rate_code in response to a request from the video decode controller CDV.

The write frame memory selector 5 generates, based on the picture coding type PCT, a write frame memory instruction signal Wf indicating any one of frame memories FM1 to FM3 to which picture data of the decoded image data DMb outputted from the video decoder 3 is to be written, and outputs the generated signal to the group of frame memories 6. The group of frame memories 6 is structured by three frame memories 6a, 6b, and 6c. These three frame memories are identified as a first frame memory FM1, a second frame memory FM2, and a third frame memory FM3, respectively. The group of frame memories 6 writes the decoded image data DMb provided by the video decoder 3 in a memory FMn (n=1, 2, or 3) specified by the received frame memory identification signal Wf for each picture unit (hereinafter referred to as "picture data").

The display frame memory selector 7 generates, based on the picture coding type, a read frame memory instruction signal Rf indicating the frame memory FMn corresponding to the picture data written therein (decoded image data DMb), outputs the generated signal to the group of frame memories 6. The group of frame memories 6 reads picture data of the decoded image data DMb from the frame memory FMn indicated by the frame memory instruction signal Rf in a predetermined order, and then outputs the digital video signal,Bstv to the video encoder Ev.

The video decode controller CDV1 includes a sequencer 10, a decode timing mask unit 12, a first I/P switch 13, and a second I/P switch 14.

The decode timing mask unit 12 is connected to the video encoder EV, the sequencer 10, and the decode start signal generator 11 for receiving inputs of the parity signal Vp, an I/P identification signal Sa, and the decode state signal Vsd respectively. The I/P identification signal Sa is a binary signal being switched in accordance with a state transition signals IP1 or IP2 for switching a parameter state and a parameter pimode that determine whether decoding by picture unit is required or not. This determination is made based on whether the currently-provided video stream STv is an interlace stream IS or a progressive stream PS based on frame_rate_code that is provided by the header information storage 4 of the video decoding section Ddv to the video decode controller CDV1.

The decode timing mask unit 12 masks the decode start signal Vsd with the parity signal Vp based on the I/P identification signal for generating a first decode start signal Vm. The sequencer 10 generates, based on the first decode start signal Vm, a control signal Sc3 for controlling the first I/P switch 13 and a control signal Sc1 for controlling the second I/P switch 14. With the control signal Sc3, the first I/P switch 13 generates the first state transition signal IP1 based on the frame_rate_code.

With the control signal Sc1, the second I/P switch 14 generates the second state transition signal IP2. Furthermore, the sequencer 10 determines, based on the first and second transition signals IP1 and IP2, whether decoding is allowed in timing defined by the first decode start signal Vm. Then, the sequencer 10 generates a second decode start signal Vmc, after correcting, if required, the first decode start signal Vm. In this sense, the second decode start signal is a decode timing signal actually defining a decode start. Note that, as will be described later with reference to a flow chart of FIG. 2 and a timing chart of FIG. 3, the second decode start signal Vmc is equal to the first decode start signal Vm.

Next, with reference to FIGS. 4(a)–4(d), the structure of the video stream STv is described. The video stream STv is normally structured by, as shown in FIG. 4(a), a sequence layer, a GOP layer, picture layers PL, and slice layers SL. The sequence layer specifies the screen format, and the GOP layer is a group of picture layers PL. The picture layer PL is added to each display frame screen, and actual decoded data follows the slice layer SL. Note that, in an example shown in the drawing, the sequence layer is structured by a sequence header, a GOP header, and a picture header.

As stated above, there are three types of pictures: an I picture, P picture, and B picture. Herein, a picture included in a stream is identified by a reference numeral with any one of suffixes I, P, and B representing these three types of picture added thereto.

As shown in FIG. 4(c), when the video stream STv (image data Mb) is comprised of picture data I0, P3, B1, B2, P6, B4, P9, B7, B8, . . . as defined by MPEG standards is provided to the video decoding apparatus VDA1, the picture data is converted by the video decoding apparatus VDA1 into a video signal Sv (digital video signal Bstv) with picture data rearranged as I0, B1, B2, P3, B4, B5, P6, B7, B8, P9 . . . according to a display order for output.

Further, as shown in FIG. 4(b), various streams that differ in frame rate such as an interlace stream IS (30 frames/s), the progressive stream PS (60 frames/s), and an interlace stream IS for movie materials (24 frames/s) are identified by a value of the frame_rate_code parameter written in the sequence header layer of each stream (for example, 0010, 0100, and 0111).

To decode the interlace stream IS, interlaced scanning is made for each of the top field and bottom field (top/bottom_field). Information for specifying which field, top or bottom (top/bottom), is first outputted from the frame memory FMn for each picture is included in the picture layer PL.

Figure 3:
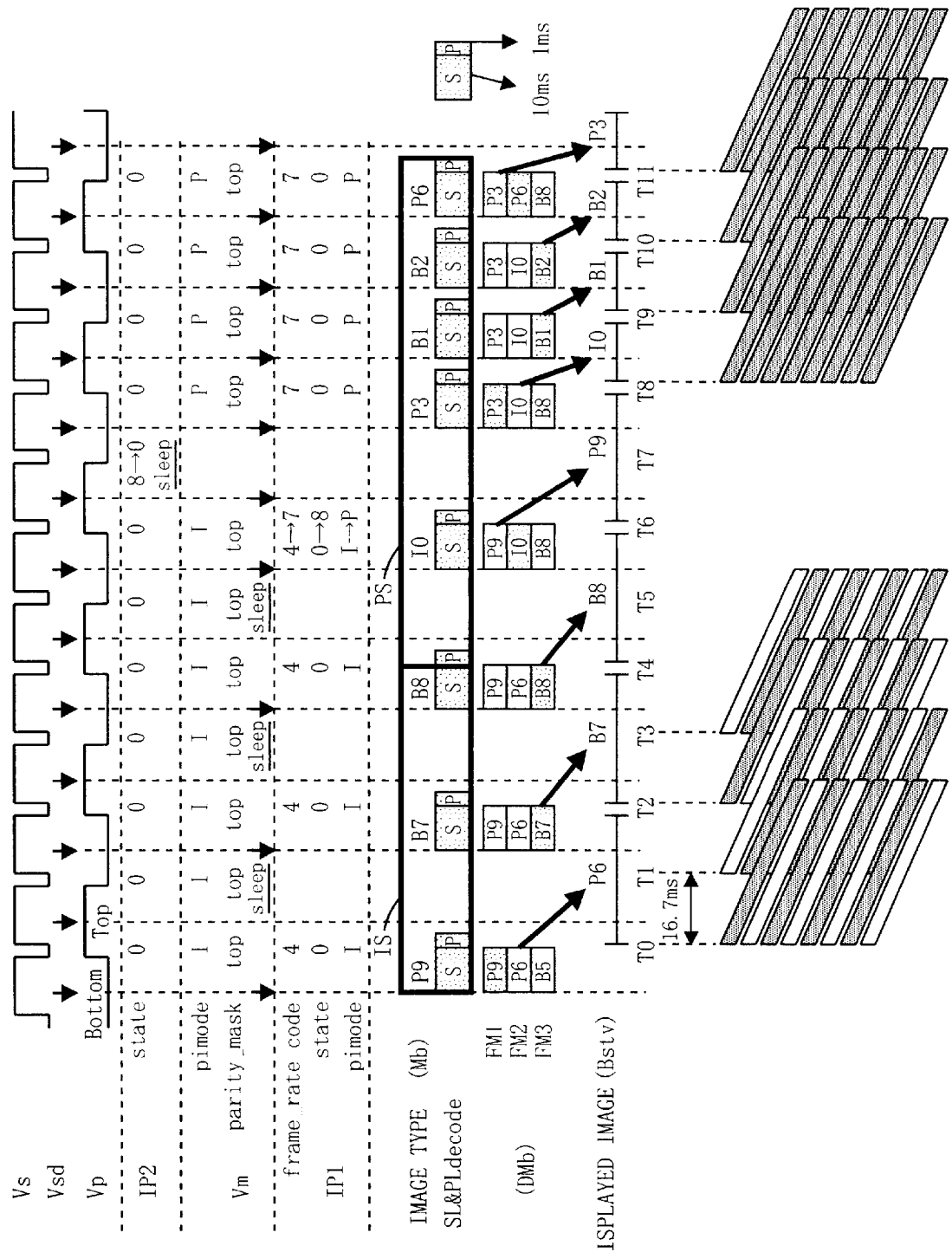
FIG. 3 is a timing chart showing timing of processing various signals observed in the video stream seamless decoding apparatus shown FIG. 1.

Note that, in the above example shown in FIG. 3, described is a case where the top field (top_field) is first displayed in image display periods T0 to T3. In this case, a parameter top_field_first is taken as an inner variable. When the parameter top_field_first=1, the top field (top_field) is first outputted. And, when the parameter top_field_first=0, the bottom field (bottom_field) is first displayed.

In the image display periods T8 to T11, output is made by each frame. In this case, a value of the parameter progressive sequence is 1. The header information Ih, typified by such parameters, in the stream is stored in the header information storage 4.

Figure 2:
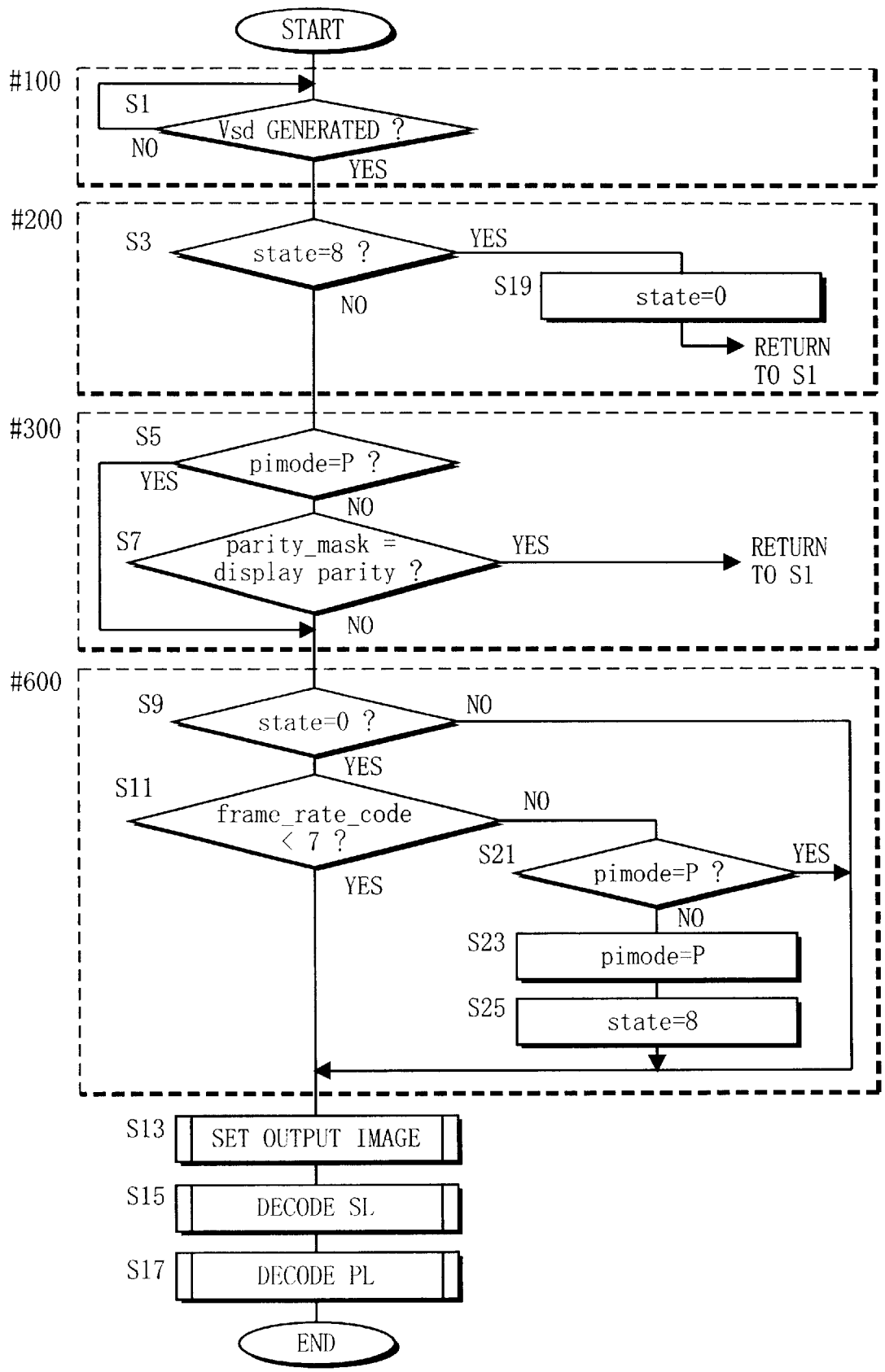
FIG. 2 is a flow chart showing the operation of the video stream seamless decoding apparatus shown in FIG. 1.

Next, with reference to the flow chart shown in FIG. 2, the operation of the video decoding apparatus VDA1 shown in FIG. 1 (mainly, the video decode controller CDV1) is described.

When the video decoding apparatus VDA1 is powered on, the decode start signal generator 11 starts generating the decode start signal Vsd based on the vertical synchronization signal Vs provided by the video encoder EV.

Then, in step S1, the video decode controller CDVL monitors whether the decode start signal Vsd is outputted from the decode start signal generator 11. Then, Yes is determined only when the decode start signal Vsd, that is, the second vertical synchronization signal, is outputted, and then the procedure goes to a next step S3. As stated above, the decode start signal Vsd is the second vertical synchronization signal for determining the basic timing to decode a stream in the present invention. Therefore, this step forms a decode start signal Vsd monitoring routine #100 for monitoring generation of the decode start signal Vsd.

In step S3, it is determined whether the parameter state for indicating that the video stream STv is being switched from the interlace stream IS to the progressive stream PS, and vice versa, takes on a value of 8, that is, whether the video stream STv is changed from the interlace stream IS to the progressive stream PS. If the value of state is not 8, that is, the video stream STv is not changed from the interlace stream IS to the progressive stream PS, No is determined, and then the procedure goes to a next step S5. On the other hand, if the value of state is 8, that is, the video stream STv is changed, the procedure goes to step S19.

In step S19, state is reset to 0, and then the procedure returns to step S1 for a sleep process. Note that, the steps S3 and S19 form a second I/P switching routine #200.

In step S5, it is determined whether the flag pimode indicating the video stream STv is the interlace stream IS or the progressive stream PS takes on a value P. Then, if a value of pimode is P, that is, if the present video stream STv is an interlace stream IS, No is determined, and then the procedure goes to a next step S7.

In step S7, it is determined whether a parameter parity_mask indicating which of the top or bottom field is to be outputted first is equal in value to the parity signal Vp (display parity) provided by the video encoder EV. Then, if not equal, No is determined, and then the procedure goes to a next step S9.

If equal, Yes is determined, and the procedure goes to step S1 for the sleep process. Note that parity_mask is a parameter for the decode timing mask unit 12 to mask the decode start signal Vsd provided by the decode start signal generator 11 using the parity signal Vp (display parity).

On the other hand, in step S5, if Yes, that is, if the present video stream STv (image data Mb) is the progressive stream PS, the procedure skips step S7 and goes to step S9. In this way, steps S5 and S7 form a mask control routine #300 for masking the decode start signal Vsd.

In step S9, if the parameter state indicating a change of the video stream STv does not take on a value 0, that is, if the video stream is being changed, No is determined, and then the procedure goes to step S13. On the other hand, if the value of state is 0, that is, if not being changed, Yes is determined, and then the procedure goes to a next step S11.

In step S11, it is determined whether frame_rate_code indicating the frame rate of the video stream STv takes on less than a value 7. That is, if the video stream STv is not the progressive stream PS, Yes is determined, and then the procedure goes to a next step S13. On the other hand, if the value of frame_rate_code is 7 or more, No is determined, and then the procedure goes to step S21.

In step S21, it is determined whether the parameter pimode is P. If Yes, that is, if the present video stream STv is the progressive stream PS, the procedure goes to step S13. On the other hand, if No, the procedure goes to step S23.

In step S23, the parameter pimode is set to P. Then, the procedure goes to a next step S25.

In step S25, the parameter state is set to 8. Then, the procedure goes to step S13. In this manner, steps S9, S11, S21, S23 and S25 form a first I/P switching routine #600.

In step S13, the write frame memory selector 5 and the display frame memory selector 7 execute, based on the picture coding type PCT, an output image setting routine for determining the frame memory in the group of frame memories 6 to/from which image data is to be written/read. Then, the procedure goes to step S15.

In step S15, an SL decode routine is executed. In other words, the slice layer SL included in one picture is decoded. Then, the procedure goes to a next step S17.

Instep S17, a PL decode routine is executed. In other words, the picture layer PL that follows the picture including the slice layer SL decoded in step S15 is decoded. Then, the procedure ends.

Note that, as stated above, in steps S15 and S17, decoding of the slice layer SL in the preceding picture in the same image display period is first executed, and then the picture layer PL in the following picture is decoded. This is because quick execution of video-decoding of the slice layer SL required for display enables video display in next display timing without interruption.

That is, information required for decoding the slice layer SL is stored in the header information storage 4 at the time of the previous decoding. Therefore, the slice layer SL can be quickly decoded. This is quite effective especially for decoding a B picture being displayed while being decoded. This will be described below with reference to FIG. 3.

With reference to the timing chart shown in FIG. 3, the decode operation of the video decoding apparatus VDA1 is described in further detail when the video stream STv is switched from the interlace stream IS to the progressive stream PS. In the present example, in the periods T0 to T4, provided to the video decoder 3 is image data Mb that is the interlace stream IS comprised of the slice layer SL of the P picture P9 and the picture layer PL of the B picture B7 (period T0), the slice layer SL of the B picture B7 and the picture layer PL of the B picture B8 (period T2), and the slice layer SL of the B picture B8 (period T4).

Then, in the periods T4 to T11, provided to the video decoder 3 is image data DMb that is the progressive stream PS comprised of the picture layer PL of the I picture I0 (period T4), the slice layer SL of the I picture I0 and the picture layer PL of the P picture P3 (period T6), the slice layer SL of the P picture P3 and the picture layer PL of the B picture B1 (period T8), the slice layer SL of the B picture B1 and the picture layer PL of the B picture B2 (period T9), the slice layer SL of the B picture B2 and the picture layer PL of the P picture P6 (period T10), and the slice layer SL of the P picture P6 and the picture layer PL of the following picture (period T11).

Note that values of Vsd, IP2, Vm, and IP1 shown in the drawing correspond to processing in the above-stated decode start signal Vsd monitoring routine #100, second I/P switching routine #200, mask control routine #300, and first I/P switching routine #600, respectively.

In the video decoding apparatus VDA1, in response to the decode start signal Vsd generated by the decode start signal generator 11 based on the vertical synchronization signal Vs provided by the video encoder EV, a decoding process shown below the decode start signal Vsd in FIG. 3 is executed. The value of the state variable is 0 when normal, and 8 when the interlace scheme is switched to the progressive scheme. The normal interlace stream IS is present in the image display periods T0 to T4. Therefore, state=0. The pimode variable indicates I for the interlace stream IS, while P for the progressive stream PS.

If pimode=P, that indicates the progressive stream PS. Therefore, the decoding process is activated for each cycle (pulse) of the vertical synchronization signal Vs. For the interlace stream IS, the decoding process is activated for every other cycle of the vertical synchronization signal Vs. Therefore, the decoding process is masked for one field parity. In the interlace stream IS of FIG. 3, top_field_first=1, and thus top_field is masked (parity_mask=1).

In the video display period T6, decoding of the slice layer SL of the I picture I0 in the progressive stream PS starts. At this time, frame_rate_code=7. Therefore, in the period T6, the value of pimode is changed from I to P, while the value of state is from 0 to 8.

Note that, in the output image setting routine in step S13, the frame memory FMn for write/read is specified among the three frame memories FM1, FM2, and FM3. In reality, based on the picture coding type PCT, the write frame memory selector 5 and the display frame memory selector 7 are controlled.

In the SL decode routine of step S15, actual video data (FIG. 4(a)) that follows the slice layer SL is decoded by controlling the video decoder 3.

In the PL decode routine of step S17, the stream analyzer 2 decodes the header information of the sequence layer, the GOP layer, and the picture layer, and stores the resultant header information Ih in the header information storage 4.

Moreover, in the present embodiment, the slice layer SL of one picture is first decoded in response to the decode start signal Vmc (Vm, Vsd), and then the picture layer PL of the following picture is decoded. This is to quickly execute video-decoding of the slice layer SL so that display for that slice layer SL is made in predetermined display timing. That is, the sequence header, GOP header, and the picture header, i.e., the information required for decoding the slice layer SL, are previously stored in the header information storage 4, and therefore decoding is performed quickly.

The above process is described in the light of a relation among the stream analyzer 2, the video decoder 3, the image data Mb, the decoded image data DMb, and the group of frame memories 6.

In the image display period T0, decoded data of the P picture P6 is written in the frame memory FM2, while decoded data of the picture B5 is written in the frame memory FM3.

The sequencer 10 determines, based on the header information Ih of the P picture P9 obtained when the picture is decoded in the previous image display period, whether to carry out stream analysis. This corresponds to the process from #100 through #600 of FIG. 2. Then, when the procedure reaches the output image setting routine S13, the frame memory FM for decoding and storing and the frame memory FMn for displaying are set. In the process in steps S15 and S17, stream analysis in the video decoder Ddv is activated by the sequencer.

The stream analyzer 2 analyzes and extracts the header information Ih in the video stream STv provided by the bit-stream FIFO 1, and also extracts the MPEG compressed image data Mb. In other words, when detecting the slice layer SL of the P picture P9 in the image data Mb, the stream analyzer 2 transfers the MPEG compressed image data Mb to the video decoder 3. Then, the video decoder 3 decodes the P picture P9. The decoded data of the P picture P9 is sequentially written in the frame memory FM1. Simultaneously, the decoded data of the P picture P6 is also read from the frame memory FM2, and, based on the display parity (parity signal Vp), the top field image display starts.

Further, if the stream analyzer 2 detects the header information of the picture layer PL, the header information Ih is decoded, extracted, and stored in the header information storage 4.

In the period T1, after display of the top field of the P picture P6 started in the period T0 ends, display of the bottom field of the P picture P6 starts based on the display parity. In the period T1, picture data decoding is not carried Out. That is, the above-stated sleep process is carried out.

In the period T2, similarly to the period T0, the slice layer SL of the B picture B7 is detected by the stream analyzer 2, and accordingly, the video decoder 3 decodes MPEG data at the slice layer. The decoded data of the picture B7 is sequentially written in the frame memory FM3, and also read out, and the top field image display thereof starts based on the display parity.

Moreover, the stream analyzer 2 decodes the header information of the picture layer PL of the following B picture B8 for extracting the header information Ih, and stores it in the header information storage 4.

In the period T3, after display of the top field of the B picture B7 started in the period T2 ends, the bottom field image display of the B picture B7 starts based on the display parity.

In the period T4, similarly to the period T2, the stream analyzer 2 detects the slice layer SL of the B picture B8, and accordingly, the video decoder 3 decodes MPEG data at the slice layer. The decoded data of the picture B8 is sequentially written in the frame memory FM3 and also read, and the top field image display thereof starts based on the display parity.

Moreover, the stream analyzer 2 decodes the header information in the picture layer PL of the I picture I0 in the following progressive stream PS for extracting the header information Ih, and stores it in the header information storage 4.

In the period T5, after display of the top field of the B picture B8 started in the period T4 ends, the bottom field image display of the B picture B8 starts based on the display parity.

In the period T5, picture data decoding process is not carried out. That is, the above-stated sleep process is performed.

In the period T6, similarly to the period T4, the stream analyzer 2 detects the slice layer SL of the I picture I0. Accordingly, the video decoder 3 decodes MPEG data at the slice layer for decoding the I picture I0. The decoded data of the I picture I0 is sequentially written in the frame memory FM2. Also, decoded data of the P picture P9 is read from the frame memory FM2, and the top field image display thereof starts based on the display parity.

Moreover, the stream analyzer 2 decodes the header information in the picture layer PL of the P picture P3 in the following progressive stream PS for extracting the header information Ih, and stores it in the header information storage 4.

In the period T7, after display of the top field of the P picture P9 started in the period T6 ends, the bottom field image display of the P picture P9 starts based on the display parity. In the period T7, the picture data decoding process is not carried out. That is, the above-stated sleep process is performed. Note that each sleep process in the periods T1, T3, and T5 is carried out by two fields because the video stream STv is the interlace stream IS. Such sleep process is not basically required for decoding the progressive stream PS.

However, if the progressive stream PS is decoded as it is at a point of changing the video stream STv from the interlace stream IS to the progressive stream PS, the last picture of the interlace stream IS is not displayed. Therefore, the sleep process is carried out by the second I/P switch 14.

In the period T8, similarly to the period T4, the stream analyzer 2 detects the slice layer SL of the P picture P3 in the progressive stream PS. Accordingly, the video decoder 3 decodes MPEG data at the slice layer for decoding the P picture P3. The decoded data of the P picture P3 is sequentially written in the frame memory FM1. Also, the decoded data of the I picture I0 is read from the frame memory FM2 for starting progressive display.

Moreover, the stream analyzer 2 decodes the header information in the picture layer PL of the following B picture B1 for extracting the header information Ih, and stores it in the header information storage 4.

In the period T9, similarly to the period T8, the stream analyzer 2 detects the slice layer SL of the B picture B1 of the progressive stream PS. Accordingly, the video decoder 3 decodes MPEG data at the slice layer for decoding the B picture B1. The decoded data of the B picture B1 is sequentially written in the frame memory FM3. Also, the decoded data of the B picture B1 is read from the frame memory FM3 for starting progressive display.

Furthermore, the stream analyzer 2 decodes the header information in the picture layer PL of the following B picture B2 for extracting the header information Ih, and stores it in the header information storage 4.

In the period T10, similarly to the period T9, the stream analyzer 2 detects the slice layer SL of the B picture B2 in the progressive stream PS. Accordingly, the video decoder 3 decodes MPEG data at the slice layer, that is, the B picture B2. The decoded data of the B picture B2 is sequentially written in the frame memory 3. Also, the decoded data of the B picture B2 is read for starting progressive display.

Moreover, the stream analyzer 2 decodes the header information in the picture layer PL of the following P picture P6 for extracting the header information Ih, and stores it in the header information storage 4.

In the period T11, similarly to the period T10, the stream analyzer 2 detects the slice layer SL of the P picture P6 in the progressive stream PS. Accordingly, the video decoder 2 decodes MPEG data at the slice layer, that is, the P picture P6. the decoded data of the picture P6 is sequentially written in the frame memory FM2. Also, the decoded data of the P picture P3 is read from the frame memory FM1 for starting progressive display.

Moreover, the stream analyzer 2 decodes the header information at the picture layer PL of the following picture (not shown) for extracting the header information Ih, and stores it in the header information storage 4.

As stated above, with the process of the first I/P switching routine #600 in the image display period T6, frame_rate_code is changed in value from 4 to 7; state from 0 to 8; and then pimode from I to P. However, in the image display period T7, the second I/P switch 14 sets state=0 and jumps to sleep, thereby prohibiting decoding.

Thus, the bottom part of the P picture P9 which overlaps the I picture I0 in time becomes displayable. As a result, decode timing is shifted by 1 Vs. Thus, seamless playback from the interlace stream IS (top_field_first=1) to the progressive stream PS without frame skipping can be achieved.

In the present invention, as typically shown by the process in the image display period T10, decoding of the vertical synchronization signal Vs starts not at one previous cycle, but at approximately a half of the previous cycle. Therefore, decoding is carried out in timing when display almost half ends and the frame memory FM becomes somewhat empty. Thus, load of overwrite control on the frame memory FM due to decoding can be lightened.

Figure 5:
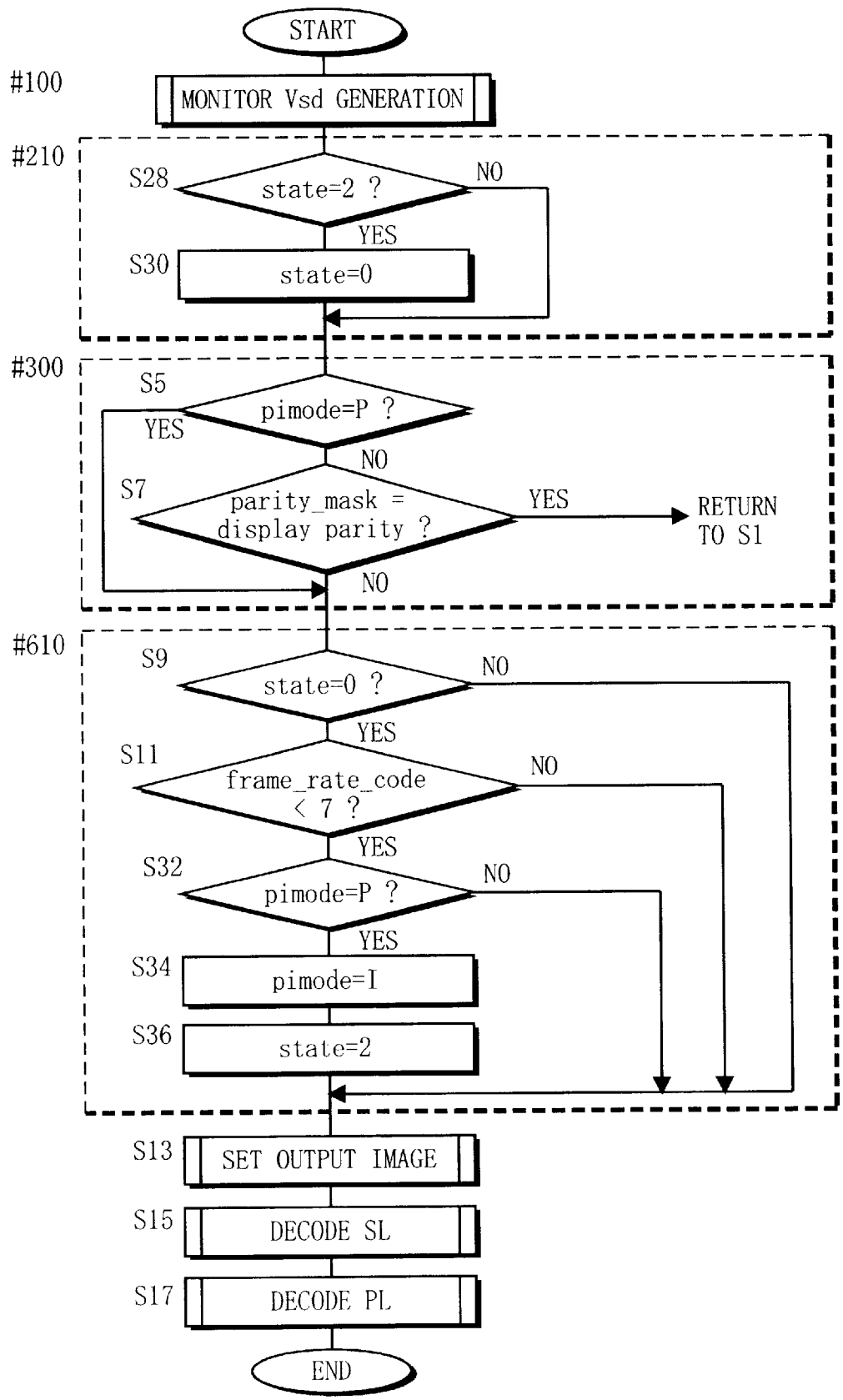
FIG. 5 is a flow chart showing the operation of an example modification of the video stream seamless decoding apparatus shown in FIG. 1.
Figure 6:
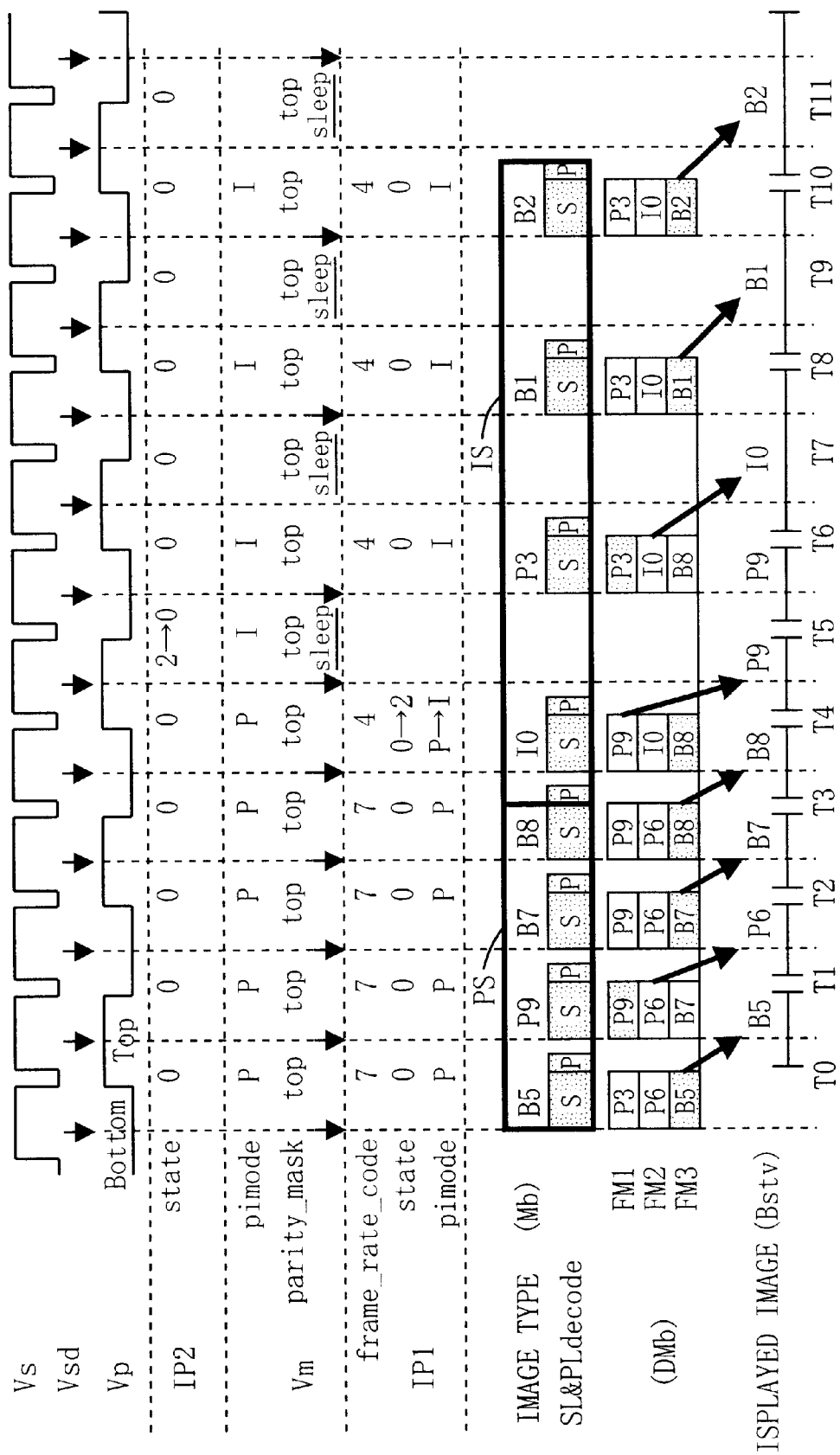
FIG. 6 is a timing chart showing timing of processing various signals observed in the modification example of the video stream seamless decoding apparatus shown in FIG. 1.

Next, with reference to FIGS. 5 and 6, one example modification of the present embodiment is described. Note that, the video decoding apparatus VDA1 in the present embodiment is the same in structure as that shown in FIG. 1, but different in control operation performed by the video decode controller CDV1.

As shown in a flow chart of FIG. 5, in the present modification, the second I/P switching routine #200 and the first I/P switching routine #600 in the flow chart shown in FIG. 2 are changed to a second I/P switching routine #210, and a first I/P switching routine #610, respectively.

The second I/P switching routine #210 consists of new steps S28 and S30. In step S28, if a value of state is not 2, the procedure goes to the next mask control routine #300. If it is determined in step S28 that the value of state is 2, the value of state is set to 0 in step S30, and then the procedure goes to the mask control routine #300.

The first I/P switching routine #610 is formed by deleting steps S21, S23, and S25 from the first I/P switching routine #600 and providing new steps S32, S34, and S36 to Yes side of step S11. If pimode indicates P in step S32, pimode is set to I in step S34. Then, in step S36, state is set to 2. On the other hand, if pimode indicates not P in step S32, the procedure goes to the output image setting routine S13.

As a result of the above-stated process, the decoding process in the present example is as shown in a timing chart of FIG. 6.

That is, in the image display period T4, a value of frame_rate_code in the header information storage 4 storing the resultant analysis of the header layer in the picture layer PL of the I picture I0 in the image display period T3 is 4. Therefore, the value of state is changed from 0 to 2, while the value of pimode is from P to I.

In the image display period T5, in the second I/P switching routine #610, the value of state is changed from 2 to 0, and the procedure jumps to sleep for prohibiting the decoding process. Thus, the I picture I0 to be displayed in the image display periods T6 to T8 can be displayed from top_field.

Thus, seamless playback from the progressive stream PS to the interlace stream IS (top_field_first=1) without errors in display parity (that is, the stream of top_field_first=1 is displayed not from the bottom_field) can be realized.

Second Embodiment

Next, with reference to FIGS. 7, 8, and 9, a video stream seamless decoding apparatus according to a second embodiment of the present invention (hereinafter abbreviated as "video decoding apparatus VDA2") is described. The video decoding apparatus VDA2 is changed from the video decoding apparatus VDA1 in that the video decode controller CDV1 is changed to a video decode controller CDV2.

The video decode controller CDV2 has the structure of the video decode controller CDV1 with a mask corrector 20 newly added. The mask corrector 20 is connected to the video encoder EV for receiving an input of the parity signal VP, and also connected to the header information storage 4 of the video decoding section Ddv for receiving an input of top field_first (in FIG. 7, abbreviated as "Tff"). The mask corrector 20 generates a control signal MA for reversing parity mask based on the received parity signal Vp and top_field_first, and outputs the generated signal to the decode timing mask unit 12.

Figure 8:
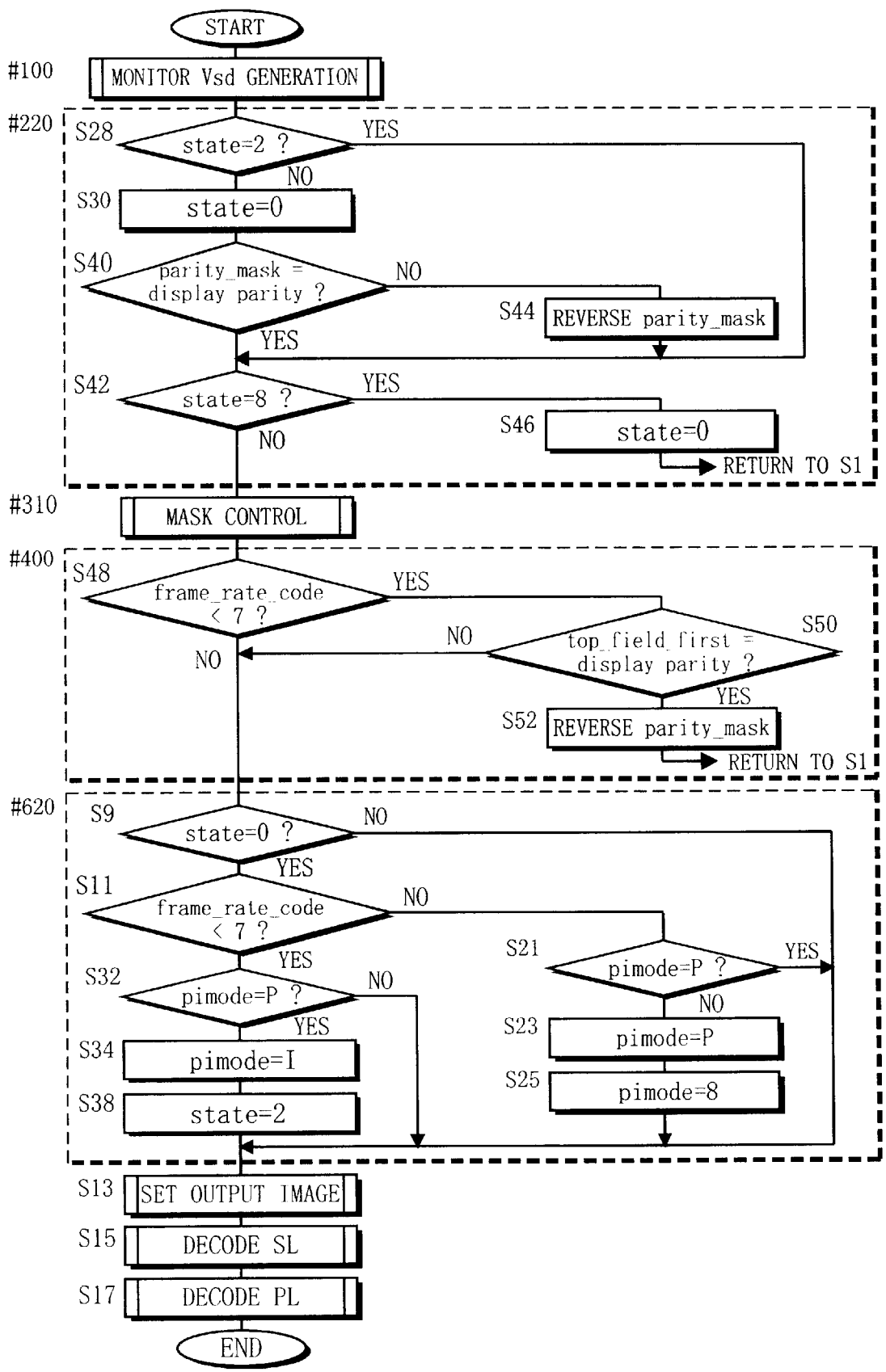
FIG. 8 is a flow chart showing the operation of the video stream seamless decoding apparatus shown in FIG. 7.

With reference to FIG. 8, the operation of the video decoding apparatus VDA2 is described. In the present embodiment, the second I/P switching routine #210 and the first I/P switching routine #610 are changed into a second I/P switching routine #220 and a first I/P switching routine #620. Furthermore, a new mask correction routine #400 is inserted between the mask control routine #31 and the first I/P switching routine #620.

The second I/P switching routine #220 is newly provided with steps S40, S42, S44, and S46 that follows step S30 of the second I/P switching routine #210.

After a value of state is set to 0 in step S30, it is determined in step S40 whether parity_mask is equal in value to the display parity (parity signal Vp). If No, parity_mask is reversed in step S44, and then the procedure goes to step S42. On the other hand, if Yes, the procedure directly goes to step S42.

In step S42, it is determined whether the value of state is 8. If Yes, the procedure goes to step S46, wherein the value of state is set to 0, and then the procedure returns to step S1 of the decode start signal Vsd monitoring routine #100 for the sleep process. On the other hand, if No, the procedure goes to the mask control routine #310.

The mask correcting routine #400 consists of steps S48, S50, and S52. After the process in the mask control routine #310 ends, it is determined in step S48 whether frame_rate_code is smaller than 7. If No, the procedure goes to the next first I/P switching routine #620. On the other hand, if Yes, it is determined in step S50 whether top_field_first is equal to the display parity (parity signal Vp). If No, the procedure goes to the first I/P switching routine #620. On the other hand, if Yes, parity_mask is reversed in step S52, and then the procedure goes to step S1 in the decode start signal Vsd monitoring routine #100 for the sleep process.

The first I/P switching routine #620 is formed in combination of the first I/P switching routine #600 (FIG. 2) and the first I/P switching routine #610 (FIG. 5). As a result, if Yes is determined in step S11, similarly to the first I/P switching routine #620, the process of steps S32, S34, and S38 is executed. On the other hand, if No, similarly to the first I/P switching routine #610, the process of steps S21, S23, and S25 is executed.

Figure 9:
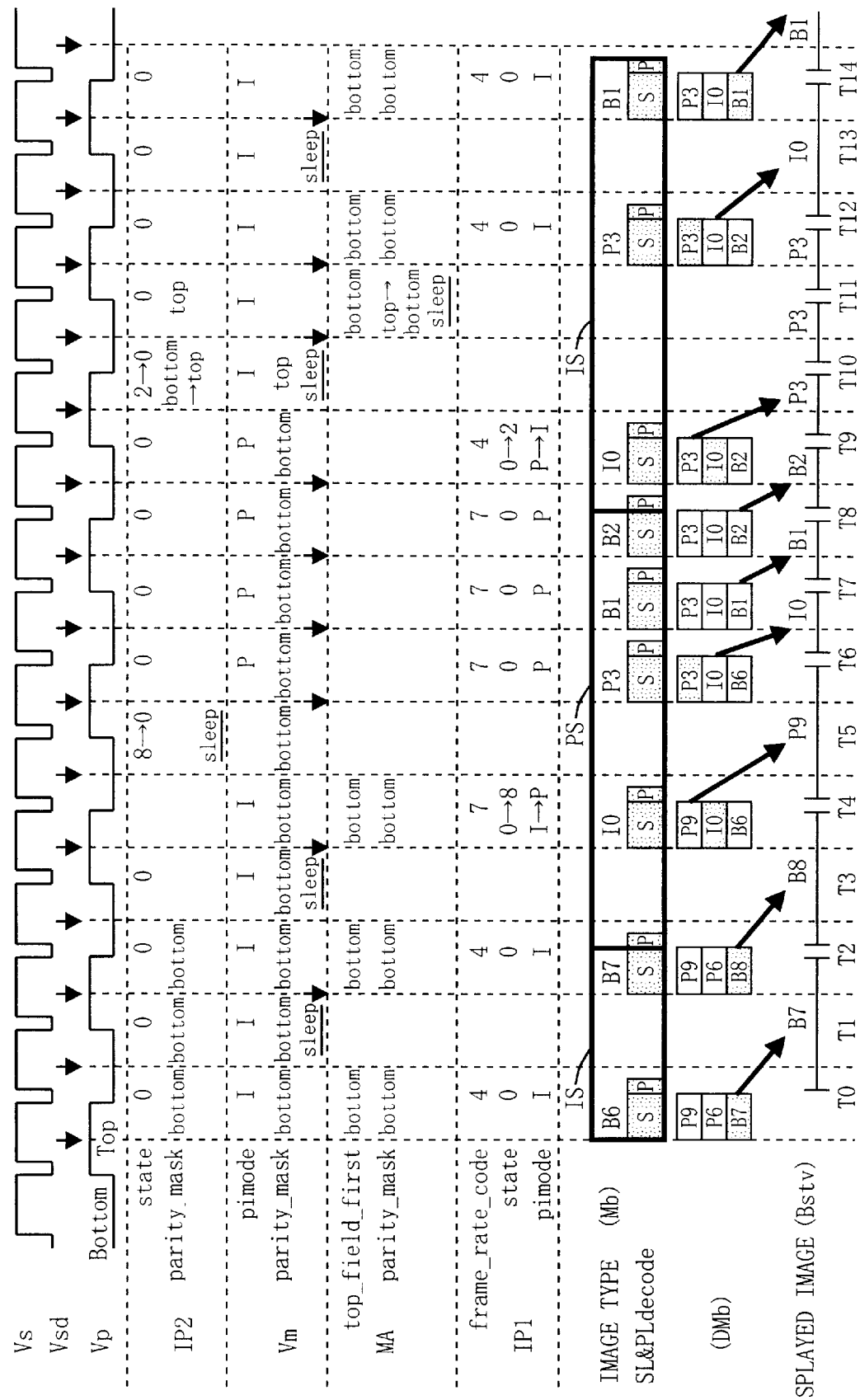
FIG. 9 is a timing chart showing timing of processing various signals observed in the video stream seamless decoding apparatus shown in FIG. 7.

As a result of the above process, the decoding process in the present example is as shown in a timing chart of FIG. 9. In this timing chart, a value of top_field_first is 0. Therefore, bottom_field of the interlace stream IS is first displayed.

Thus, when a transition takes place from the progressive stream PS to the interlace stream IS, that is, in the image display period T9, the value of state is changed from 0 to 2 through the first I/P switching routine #620.

In the image display period T10, it is determined in step S40 of the second I/P switching routine #220 that parity_mask is not equal in value to the display parity (Vp).

Consequently, in step S44, parity_mask is reversed in level.

Furthermore, it is determined in step S7 of the mask control routine #310 that parity_mask is equal in value to the display parity (Vp). Then, the procedure goes to step S1 of the decode start signal Vsd monitoring routine. #100 for the sleep process.

Moreover, in the image display period T11, in step S52 of the mask correcting routine #400, parity_mask is reversed (toggled), and then the procedure goes to step S1 for the sleep process.

In this manner, the decoding process is not performed in a period of 2 Vs. Thus, in the image display periods T12 to T14, bottom_field can be displayed first. Consequently, even when the video stream STv is changed to the interlace stream IS or the progressive stream PS, seamless playback can be performed.

Third Embodiment

Figure 10:
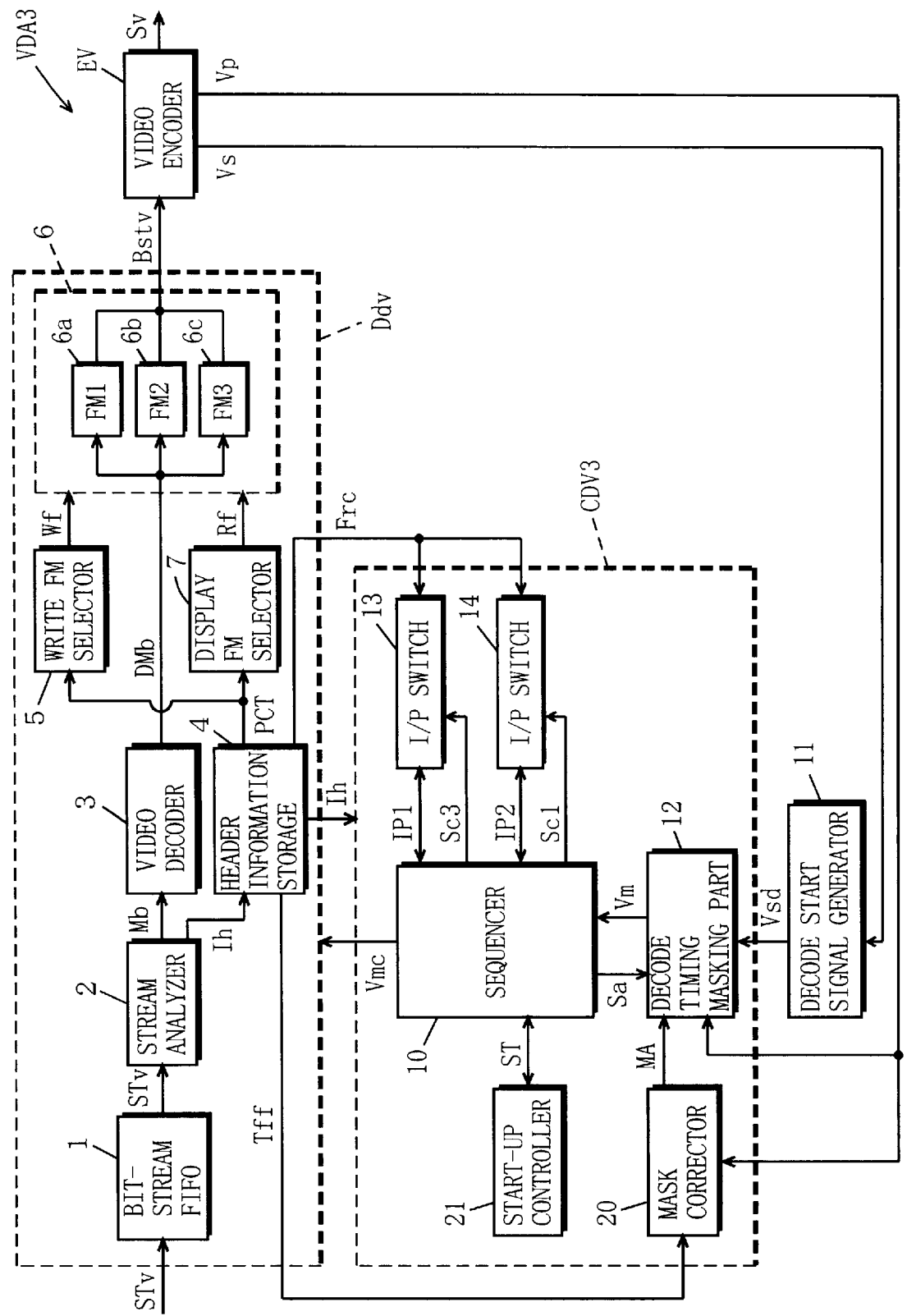
FIG. 10 is a block diagram showing the structure of a video stream seamless decoding apparatus according to a third embodiment of the present invention.

Next, with reference to FIGS. 10, 11, and 12, a video stream seamless decoding apparatus according to a third embodiment of the present invention (hereinafter abbreviated as "video decoding apparatus VDA3") is described. The video decoding apparatus VDA3 is similar to the video decoding apparatus VDA2 shown in FIG. 7, but the video decoding controller CDV2 is changed to a video decoding controller CDV3.

The video decode controller CDV has the same structure as that of the video decode controller CDV2 with a start-up controller 21 newly provided thereto. The start-up controller 21 is connected to the sequencer 10 to exchange therebetween a control signal ST for setting vdec_mode. vdec_mode is an initial-state parameter having a binary value to define the initial state of the video decode controller CDV3.

Figure 11:
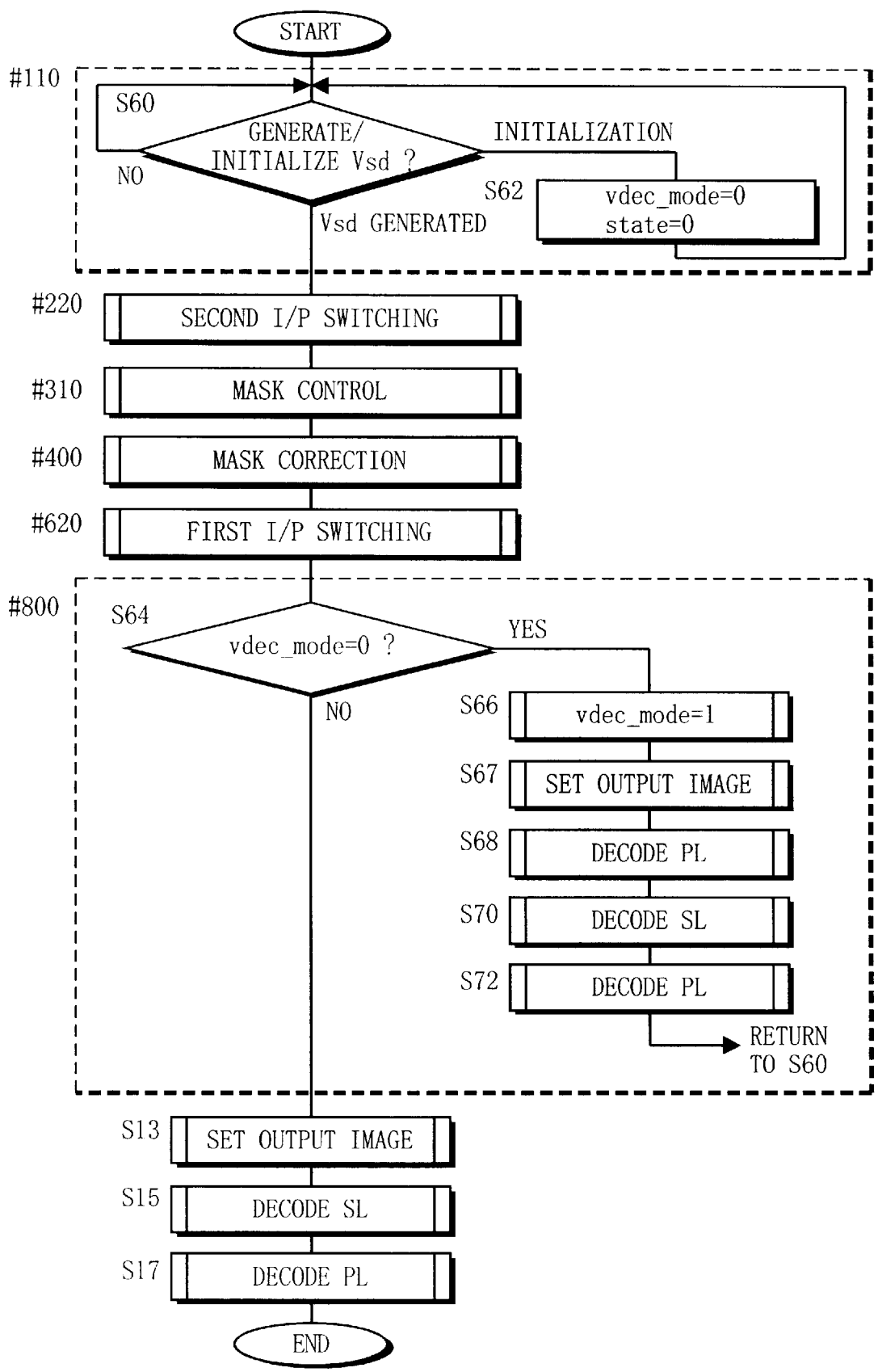
FIG. 11 is a flow chart showing the operation of the video stream seamless decoding apparatus shown in FIG. 10.

With reference to a flow chart shown in FIG. 11, the operation of the video decoding apparatus VDA3 is described. The operation in the present embodiment is structured by a decode start signal Vsd monitoring routine #110, which is a modified version of the above-stated decode start signal Vsd monitoring routine #100, second I/P switching routine #220, mask control routine #310, mask correcting routine #400, first I/P switching routine #620, output image setting routine S13, SL decode routine S15, and PL decode routine S17. Furthermore, a start-up control routine #800 is newly provided between the first I/P switching routine #620 and the output image setting routine S13.

The decode start Vsd monitoring routine #110 consists of step S60 for determining whether the decode start signal Vsd signal has been generated or initialization is required, and initialization step S62.

In step S60, if it is determined that the decode start signal Vsd has been generated, similarly to the decode start signal Vsd monitoring routine #100, the procedure goes to the second I/P switching routine #220. On the other hand, if it is determined that initialization is required, a value of a parameter vdec_mode is set to 0 in step S62, and the value of state is set to 0. Then, the procedure returns to step S60 for the sleep process.

Note that, in the decode start signal Vsd monitoring routine #110, the first step is not step S1 but step S60. Therefore, in this flow chart, it is needless to say that the step that the procedure should go to for the sleep process is step S60.

The start-up control routine #800 consists of steps S64, S66, S67, S68, S70, and S72. After the process in the first I/P switching routine #620, it is determined in step S64 whether vdec_mode indicates 0. If No, the procedure goes to the output image setting routine S13. On the other hand, if Yes, the procedure goes to a next step S66, where vdec_mode is set to 1. Then, the procedure goes to step S67.

In step S67, similarly to the above-stated step S13, the output image setting is carried out. Then, in step S68, similarly to the PL decode routine S17, the picture layer PL is decoded. Then, the procedure goes to step S70.

In step S70, similarly to the SL decode routine. S15, the slice layer SL is decoded. Then, the procedure goes to step S72.

In step S72, the picture layer PL is further decoded. The procedure then returns to the decode start signal Vsd monitoring routine #110 for the sleep process.

Figure 12:
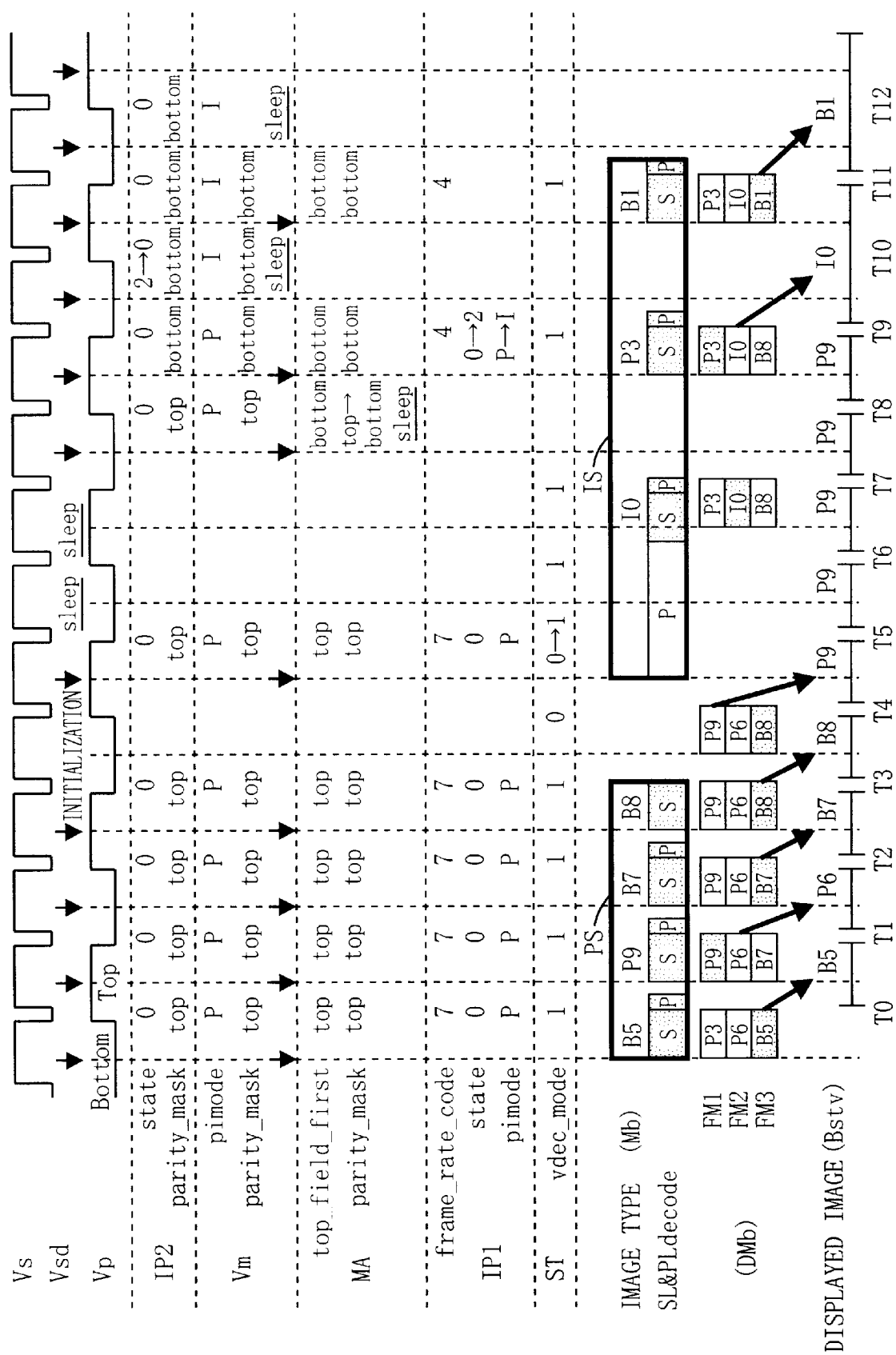
FIG. 12 is a timing chart showing timing for processing various signals observed in the video stream seamless decoding apparatus shown in FIG. 10.

As a result of the above process, the decoding process in the present example is as shown in a timing chart of FIG. 12.

In this timing chart, initialization is carried out in the image display periods T3 to T4. With this initialization, in step S62 of the decode start signal Vsd monitoring routine #110, vdec_mode is set to 0, and the value of state is set to 0.

In the image display period T5, the start-up controller 21 changes the value of vdec_mode from 0 to 1 in step S66.

Thus, a start-up can be carried out for starting the decoding process required after initialization due to operation such as channel switching.

Figure 13:
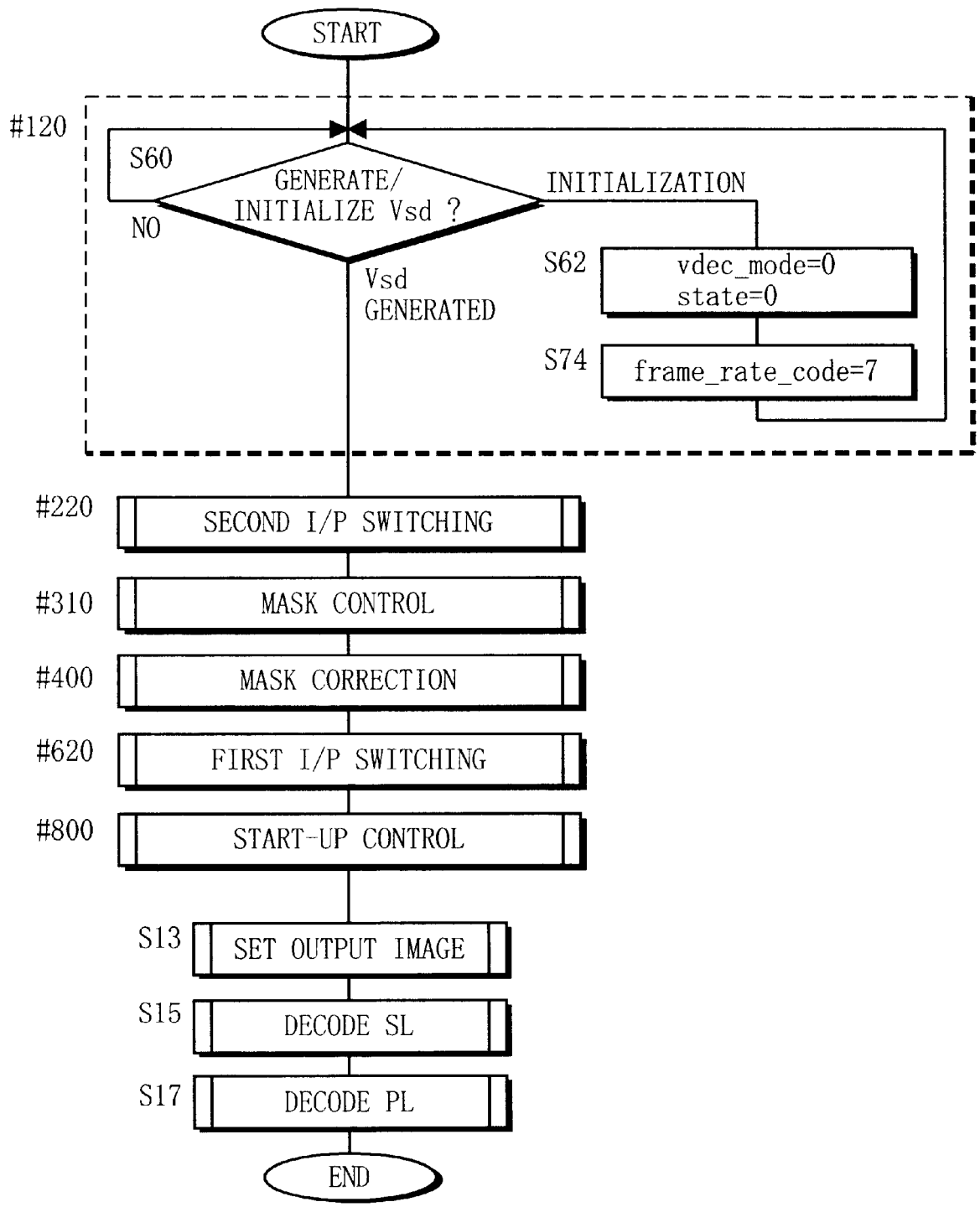
FIG. 13 is a flow chart showing the operation of an example modification of the video stream seamless decoding apparatus shown in FIG. 10.

Next, with reference to FIGS. 13, 14, 15, and 16(a) and 16(b), one modification of the present embodiment is described. In this modification, the video decoding apparatus VDA is the same in structure as shown in FIG. 10, but different in control operation of the video decode controller A flow chart of the this modification is, as shown in FIG. 13, the same of the flow chart shown in FIG. 11 with a new step S74 added to the decode start signal Vsd monitoring routine #110 to form the decode start signal Vsd monitoring routine #120.

In other words, after vdec mode is set to 0 and the value of state is set to 0 in step S62, the value of frame_rate_code is further set to 7 in step S74, and then the procedure returns to step S60 for the sleep process.

Figure 14:
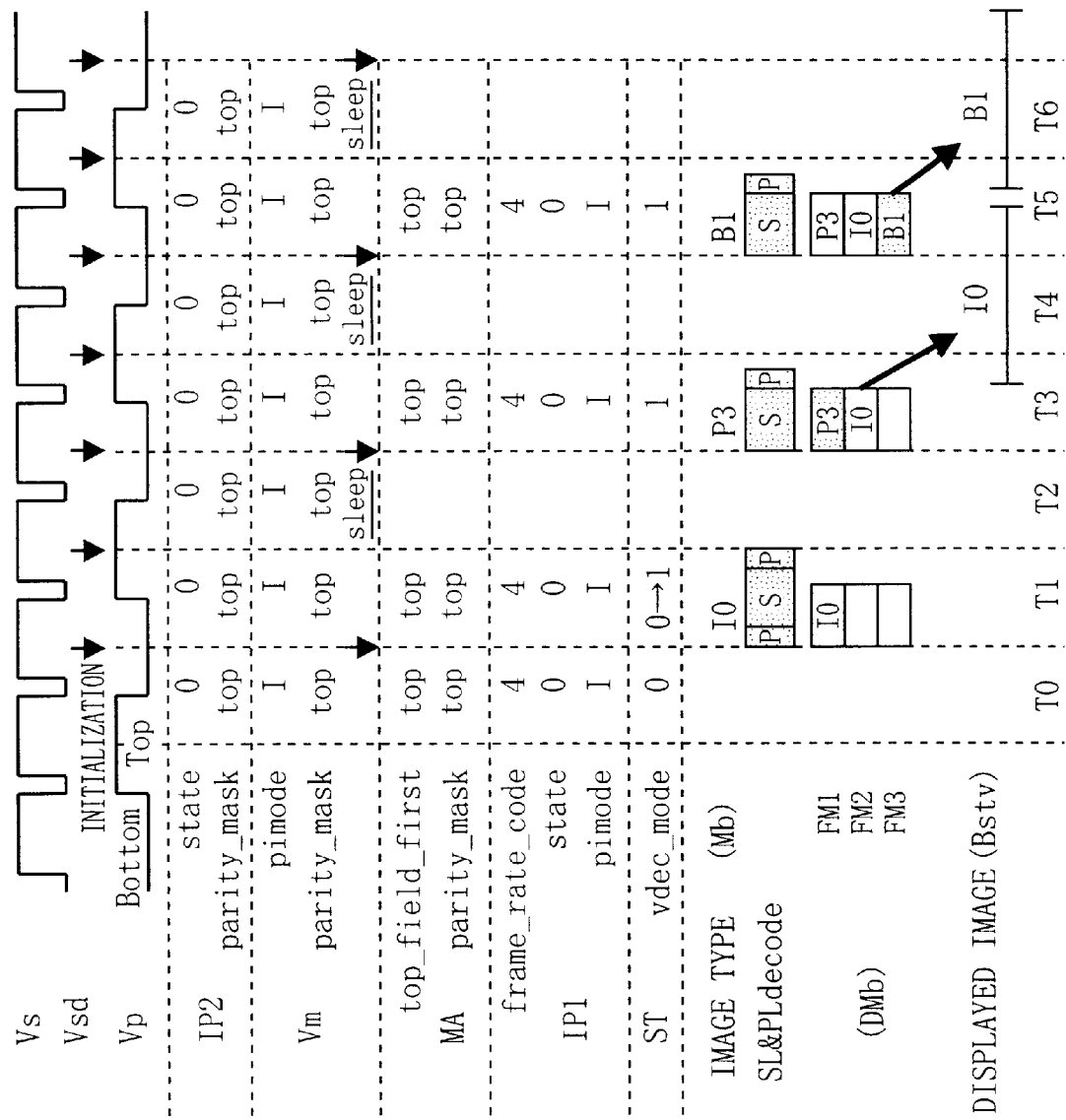
FIG. 14 is one timing chart showing timing of processing various signals observed in the example embodiment of the video stream seamless decoding apparatus shown in FIG. 10.

This means, in a timing chart shown in FIG. 14, when frame_rate_code is 4, the interlace stream IS is normally displayed at start-up.

Figure 15:
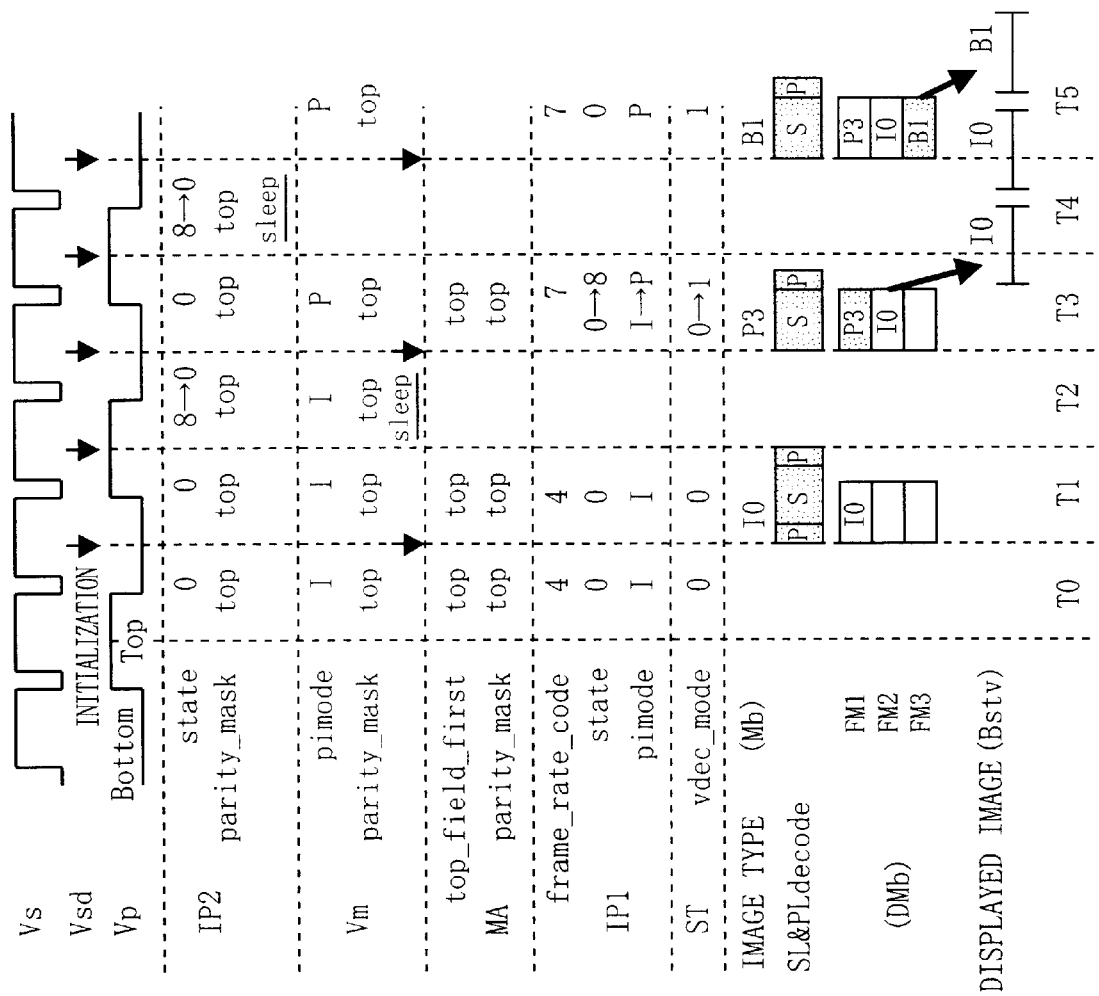
FIG. 15 is another timing chart showing timing of processing various signals observed in the example modification of the video stream seamless decoding apparatus shown in FIG. 10.

However, in FIG. 15, if frame_rate_code is set to 4 at initialization, when the input stream is progressive one, I picture I0 to be displayed in the image display periods T4 to T5 is displayed twice.

Figure 16B:
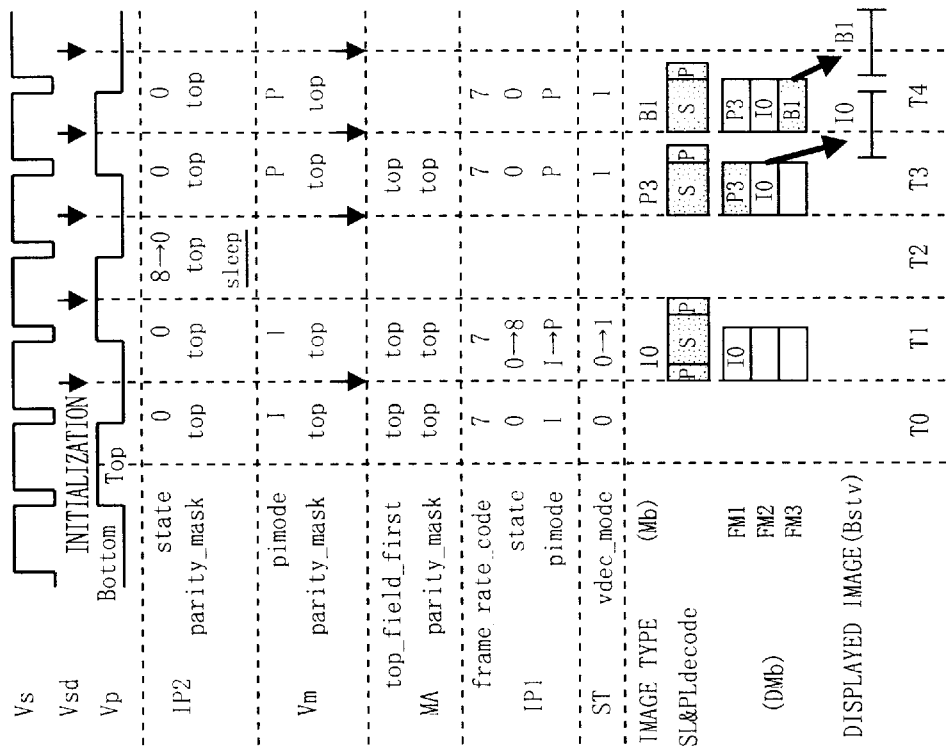
FIGS. 16(a)–16(b) are still another set of timing charts showing timing of processing various signals observed in the example embodiment of the video stream seamless decoding apparatus shown in FIG. 10.
Figure 16A:
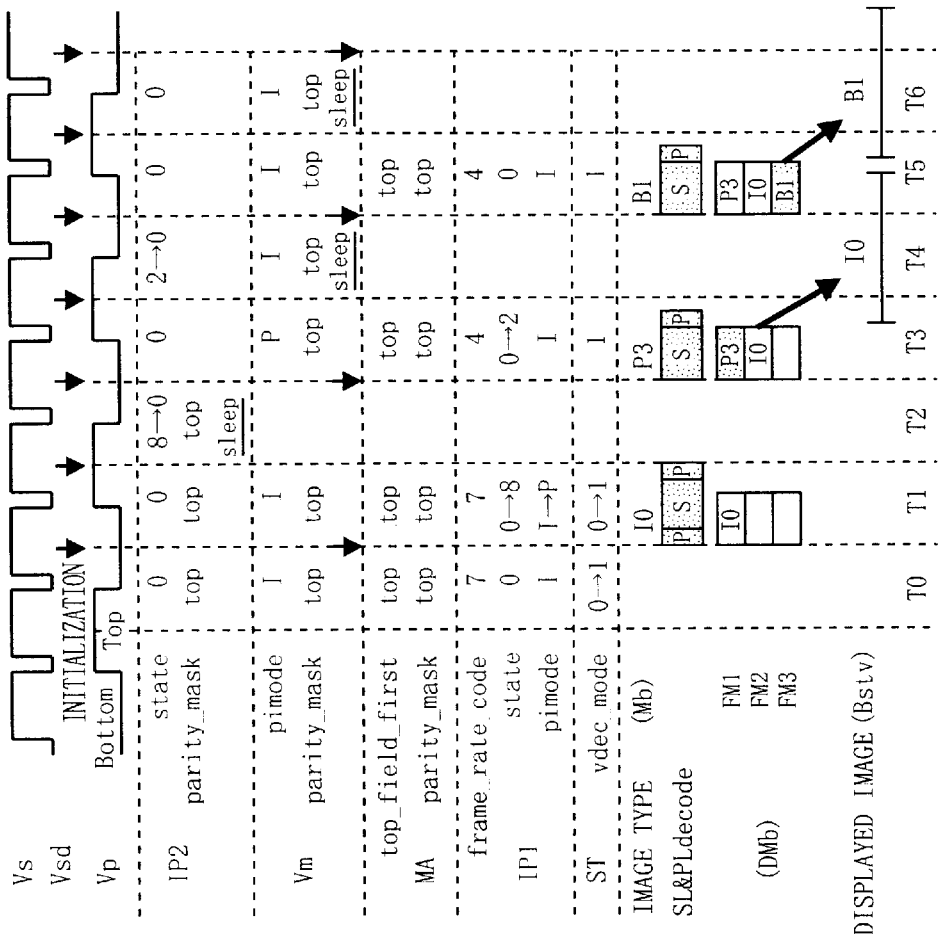

Therefore, frame_rate_code is set to 7, and thereby, as shown in FIGS. 16(a) and 16(b), start-up of either stream can be normally displayed.

In this way, the sleep operation that supposedly occur in the period T4 in the example shown in FIG. 15 is prevented in an example shown in FIG. 16(b) by setting frame_rate_code to 7.

As a result of the above process, the decoding process in the present example is shown in FIGS. 14, 15, 16(a), and 16(b).

Fourth Embodiment

Figure 17:
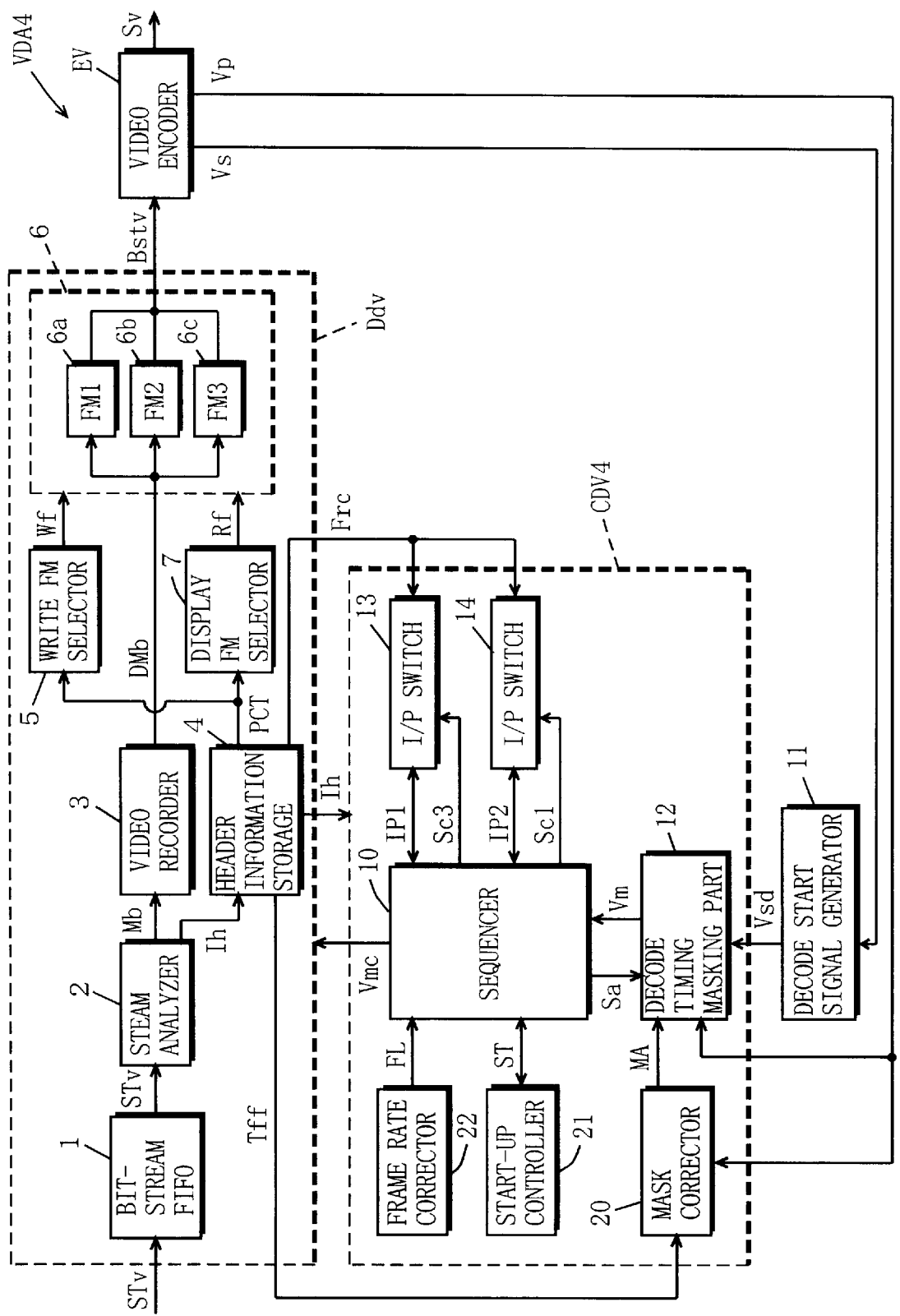
FIG. 17 is a block diagram showing the structure of a video stream seamless decoding apparatus according to a fourth embodiment of the present invention.

Next, with reference to FIGS. 17, 18, and 19, a video stream seamless decoding apparatus according to a fourth embodiment of the present invention (hereinafter abbreviated as "video decoding apparatus VDA4"). The video decoding apparatus VDA4 is similar to the above-stated video decoding apparatus VDA3 according to the third embodiment with a frame rate corrector 22 for exchanging with the sequencer 10 a control signal FL that sets a correction ratio added to the video decode controller CDV3 to form a video decode controller CDV4.

A process when the interlace stream IS of 24 frames/SP is changed to the progressive stream PS in the video decoding apparatus VDA4, so-called 3:2 pull-down process, is described below.

Figure 18:
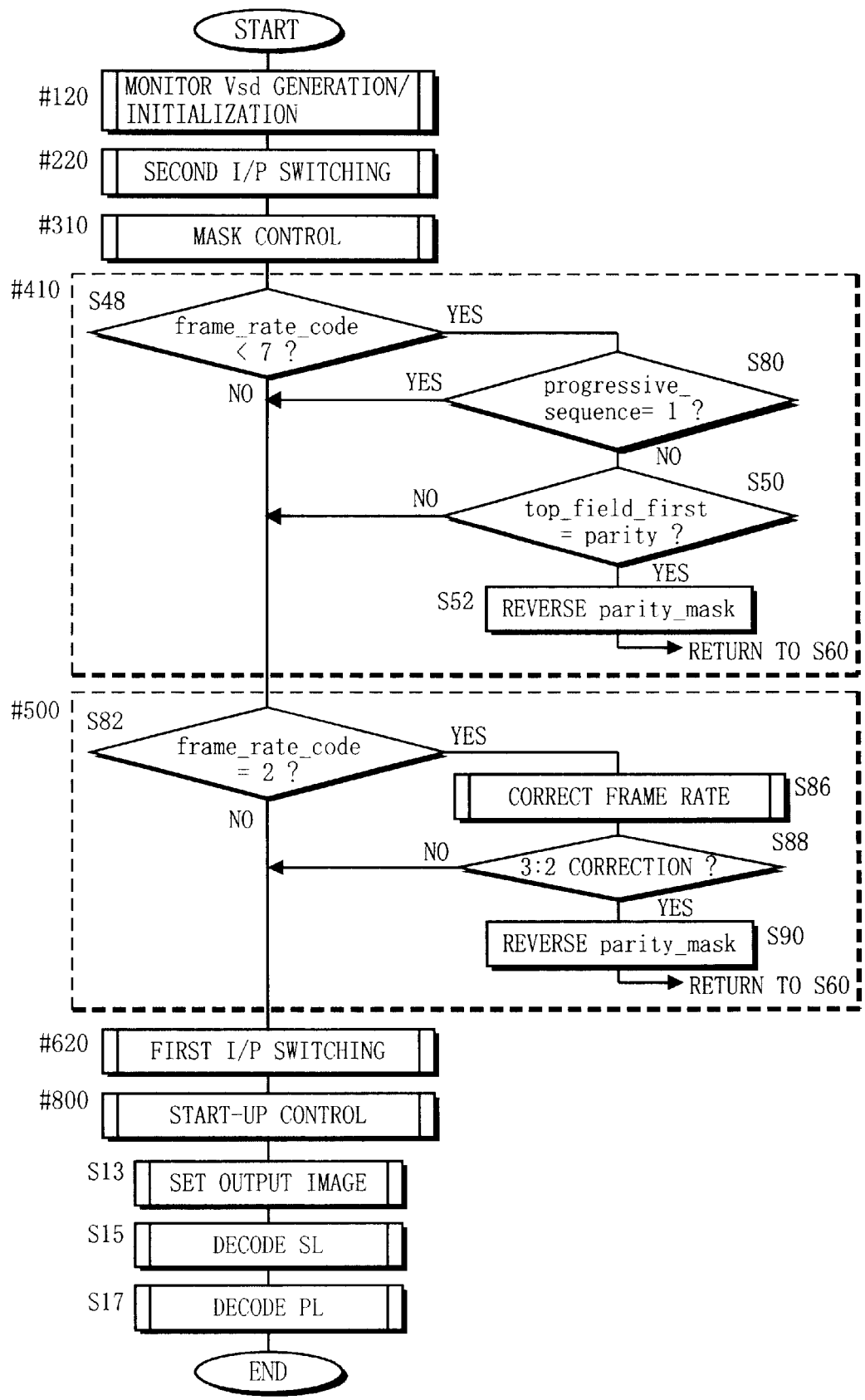
FIG. 18 is a flow chart showing the operation of the video stream seamless decoding apparatus shown in FIG. 17.

As shown in FIG. 18, a flow chart for the video decoding apparatus VDA4 is similar to that shown in FIG. 11 with the mask correcting routine #400 changed to a mask correcting routine #410. Furthermore, a frame rate correcting routine #500 is inserted between the mask correcting routine #410 and the first I/P switching routine #620. Also, the decode start signal Vsd monitoring routine #110 is replaced with the decode start signal Vsd monitoring routine #120 shown in FIG. 13.

The mask correcting routine #410 is structured by the mask correcting routine #400 with a new step S80 inserted in steps S48 and S50. That is, in step S48, if it is determined that frame_rate_code is smaller than 7, the procedure goes to the inserted step S80, wherein it is determined whether a value of progressive sequence is 1.

If Yes in step S80, the procedure goes to the next frame rate correcting routine #500. This is because, since the frame image is a progressive image without distinction between top_field and bottom_field, parity check in step S50 is not required. On the other hand, if No, the procedure goes to step S52. The following process has been described in the mask correcting routine #400.

The frame rate correcting routine #500 consists of steps S82, S86, S88, and S90.

It is determined in step S82 whether the value of frame_rate_code is 2. If No, the procedure goes to the first I/P switching routine #620. On the other hand, if Yes, the procedure goes to the frame rate correcting routine S86 and then step S88 for determining whether a correction ratio is 3:2.

If No in step S88, the procedure goes to the first I/P switching routine #620. On the other hand, if Yes, parity_mask is reversed in level in step S90, and then the procedure goes to step S60 of the decode start signal Vsd monitoring routine #120 for executing the sleep process.

Figure 19:
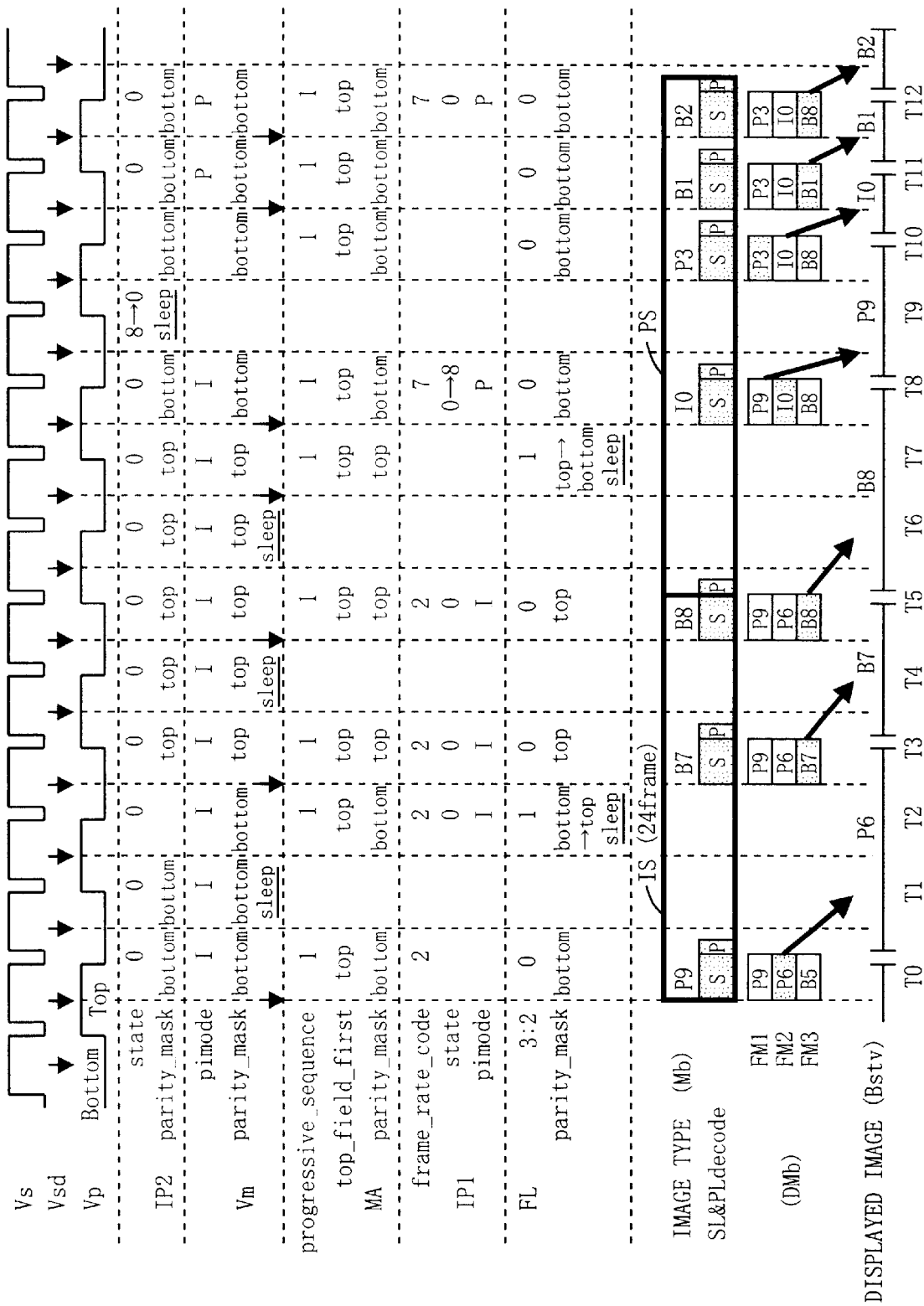
FIG. 19 is a timing chart showing timing of processing various signals observed in the video stream seamless decoding apparatus shown in FIG. 17.

As a result of the above-described process, the decoding process in the present example is as shown in a timing chart of FIG. 19.

Thus, by carrying out the 3:2 pull-down process on the 24P interlace stream IS, seamless playback can be performed for the progressive stream PS that follows the interlace stream IS. Moreover, with the mask correcting routine #410 and the frame rate correcting routine #500, as shown in the image display periods T0 to T4, the 24P interlace stream IS can be played back.

Fifth Embodiment

Figure 20:
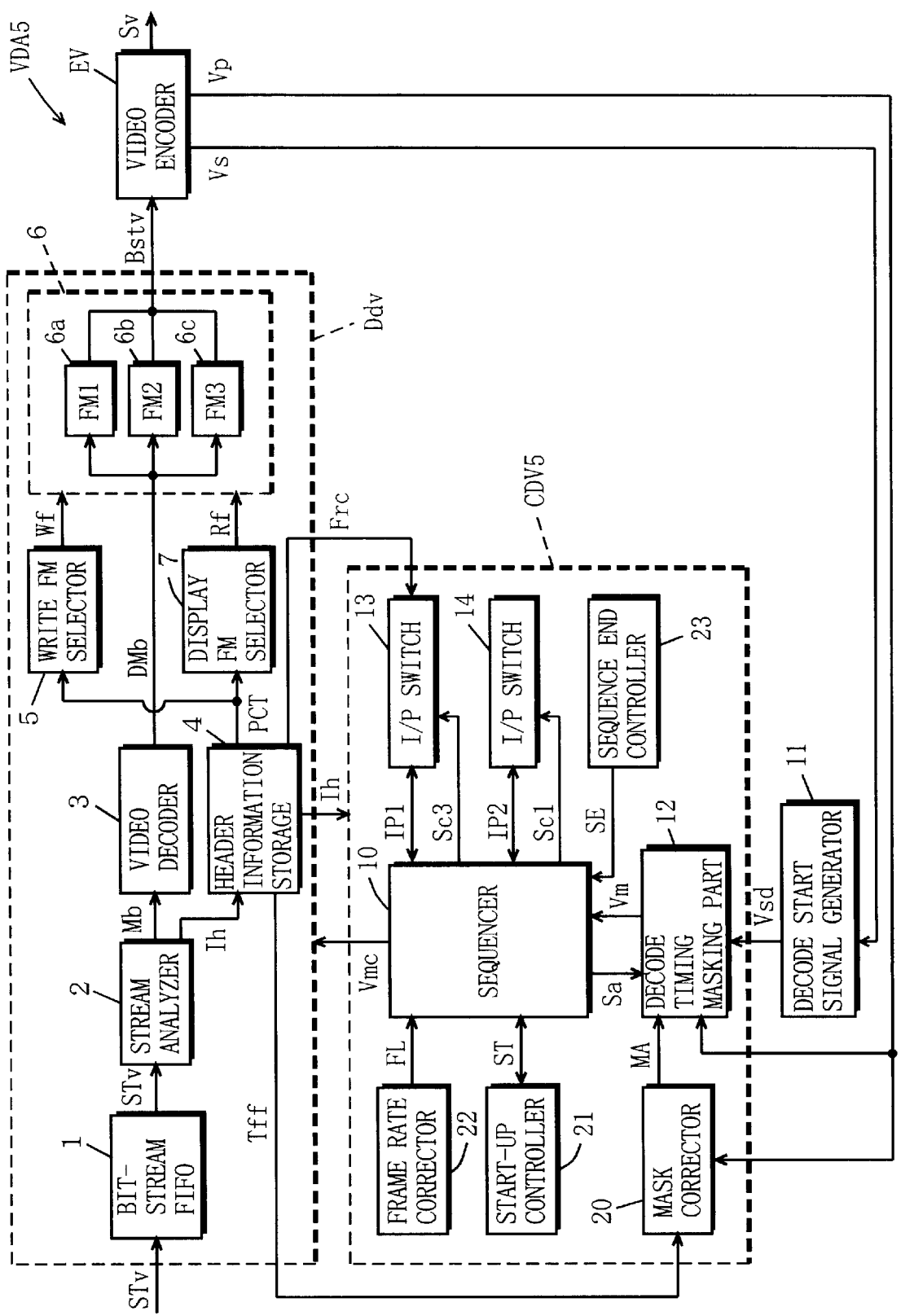
FIG. 20 is a block diagram showing the structure of a video stream seamless decoding apparatus according to a fifth embodiment of the present invention.

Next, with reference to FIGS. 20, 21, and 22, a video stream seamless decoding apparatus according to a fifth embodiment of the present invention (hereinafter abbreviated as "video decoding apparatus VDA5") is described. The video decoding apparatus VD5 is similar to the above-described video decoding apparatus VDA4 according to the fourth embodiment with a sequence end controller 23 newly added to the video decode controller CDV4 to form a video decode controller CDV5.

Figure 21:
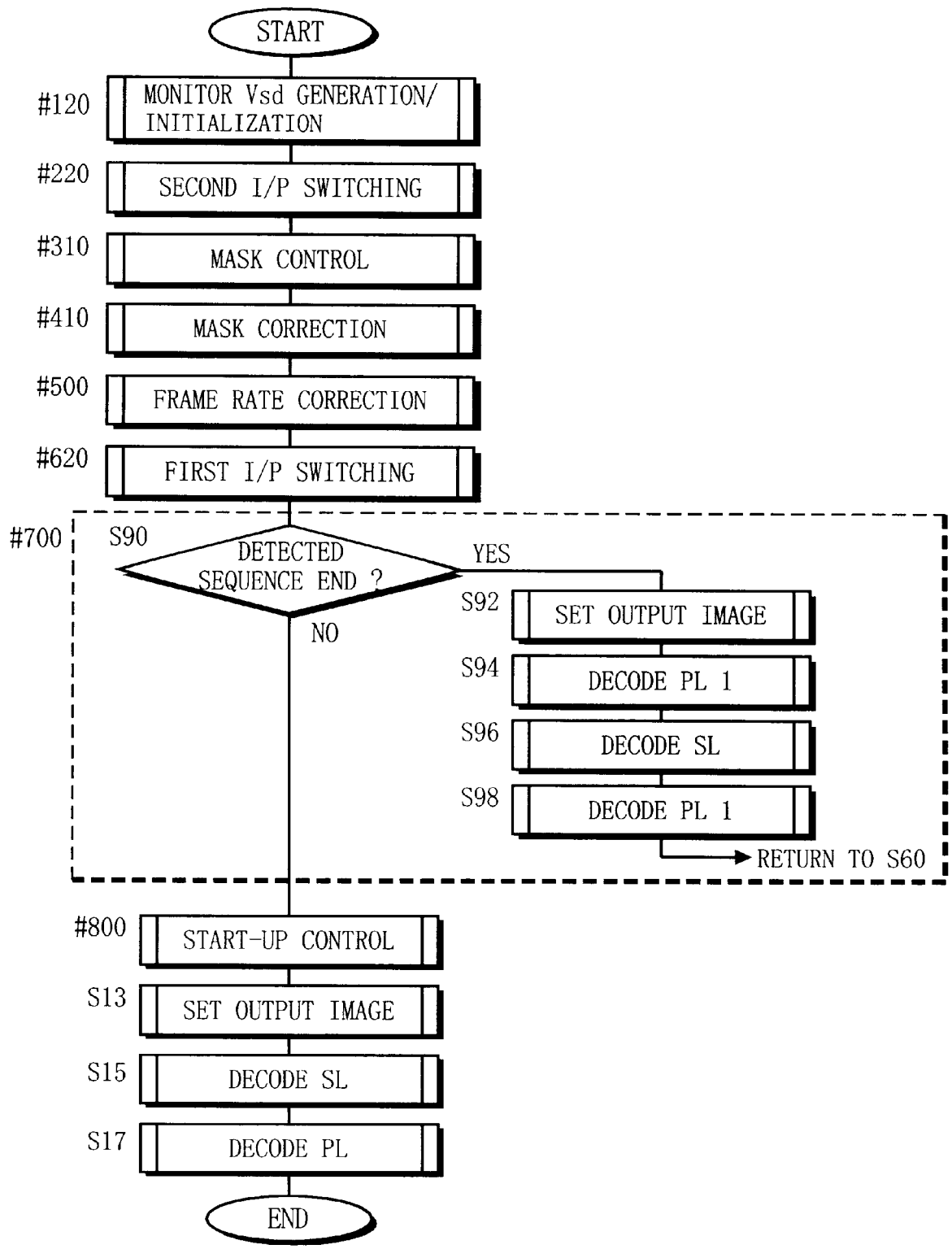
FIG. 21 is a flow chart showing the operation of the video stream seamless decoding apparatus shown in FIG. 20.

AS shown in FIG. 21, a flow chart for the video decoding apparatus VDA5 is formed by newly inserting a sequence end detecting routine #700 between the first I/P switching routine #620 and the start-up control routine #800 shown in FIG. 11.

The sequence end detecting routine #700 consists of step S90 for determining whether a sequence end is detected, an output image setting routine S92, a routine S94 for decoding the picture layer PL, a routine S96 for decoding the slice layer SL, and a routine S98 for decoding the picture layer PL.

This embodiment has a unique characteristic that sequence end detection causes the procedure to go to the next step, which other embodiments do not have.

In step S90, if the sequence end is not detected, No is determined, and the procedure goes to the start-up control routine #800. On the other hand, if Yes, the output image setting is carried out in step S92, and then the picture layer PL is decoded in step S94. Then, in step S96, the slice layer SL is decoded. Then, the picture layer PL is decoded in step S98. Thereafter, the procedure goes to step S60 in the decode start signal Vsd monitoring routine #120 for the sleep process.

Figure 22:
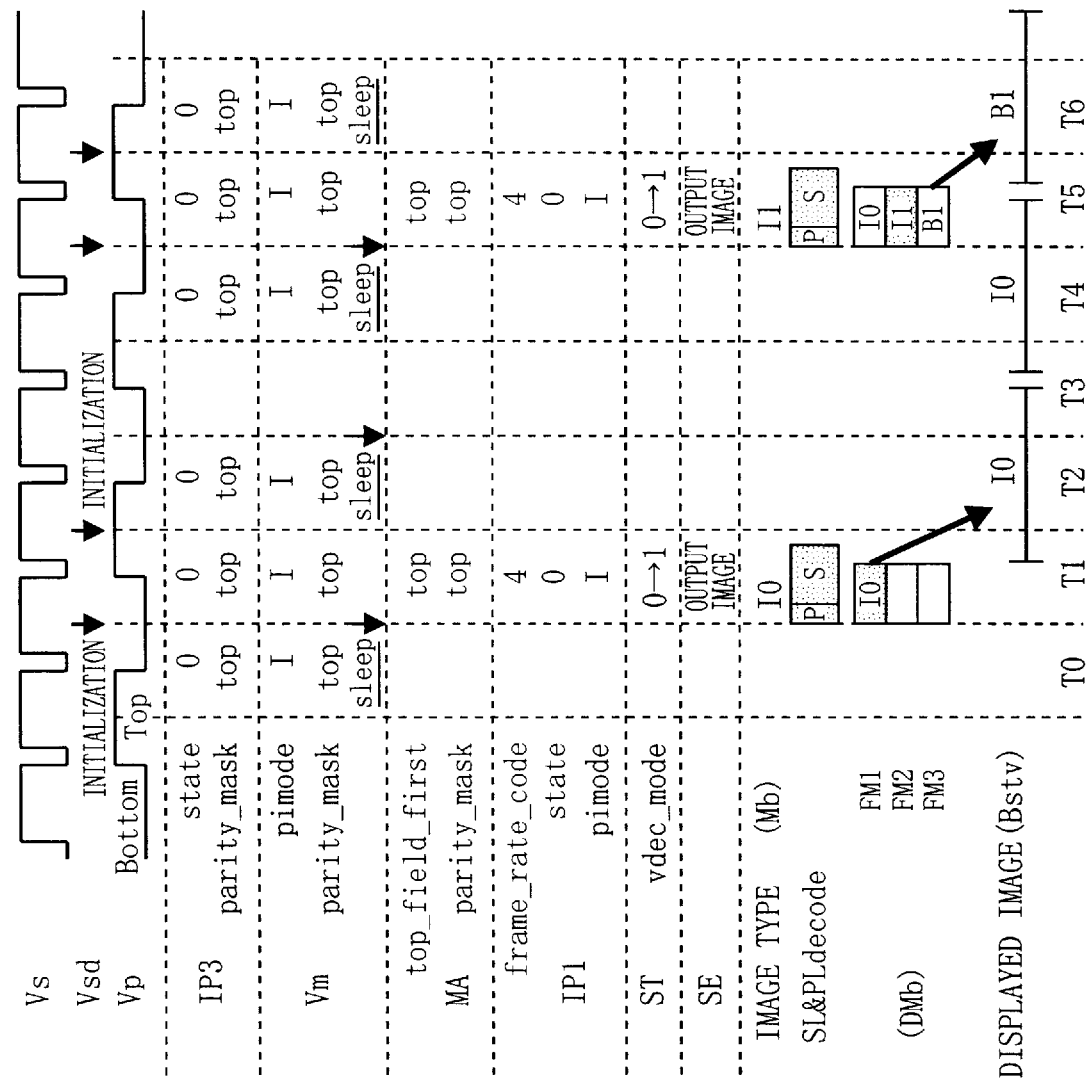
FIG. 22 is a timing chart showing timing of processing various signals observed in the video stream seamless decoding apparatus shown in FIG. 20.
Figure 23:
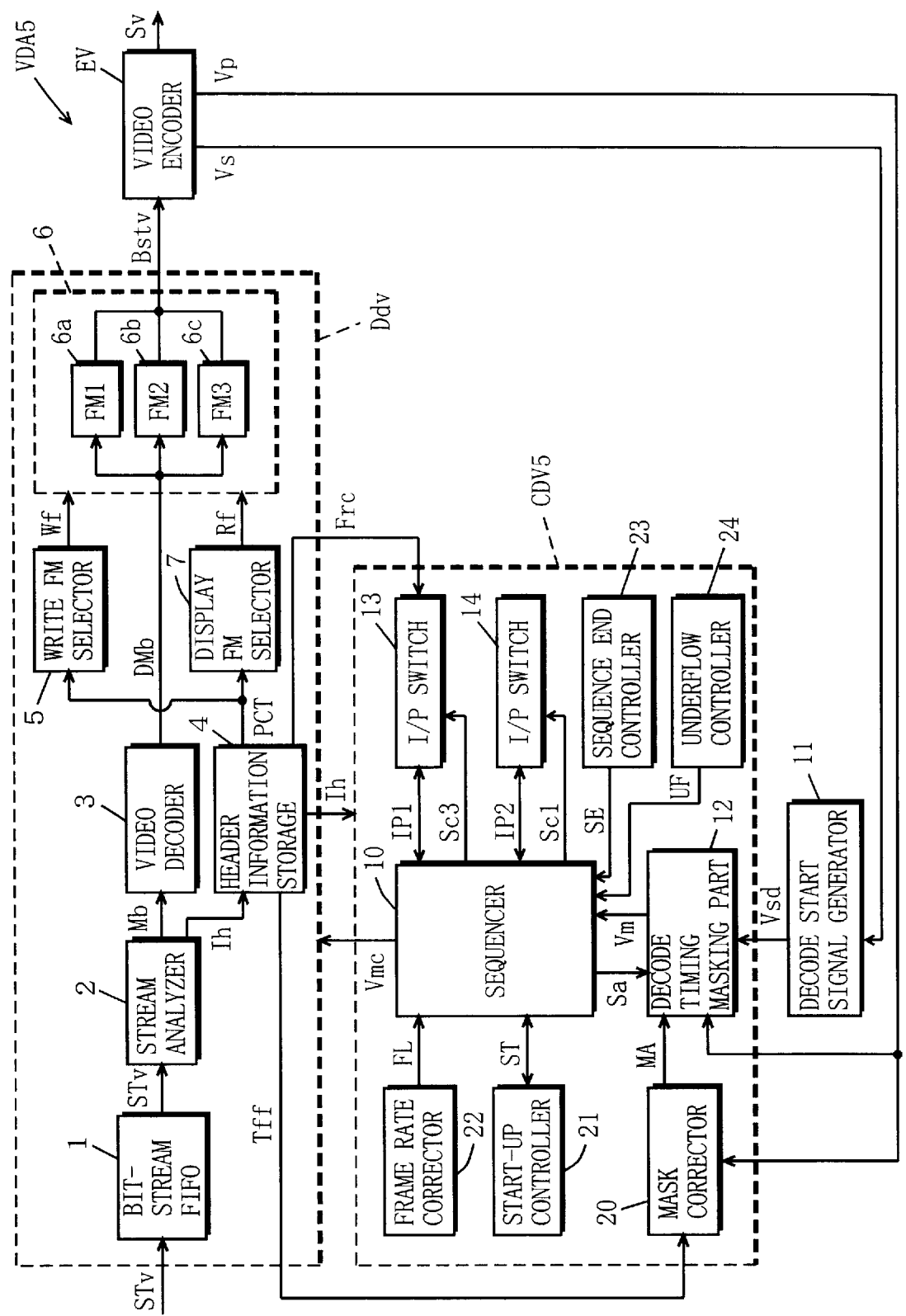
FIG. 23 is a block diagram showing the structure of a video stream seamless decoding apparatus according to a sixth embodiment of the present invention.

As a result of the above-described process, the decoding process of the present example is as shown in a timing chart of FIG. 22. Shown in FIG. 22 is an operation when the video stream STv structured as shown in FIG. 4(d) is inputted. This can be used mainly for still-picture service and I-picture-specific playback.

Sixth Embodiment

Next, with reference to FIGS. 23, 24, 25, and 26, a video stream seamless decoding apparatus according to a sixth embodiment of the present invention (hereinafter abbreviated as "video decoding apparatus VDA6") is described. The video decoding apparatus VDA6 is similar to the video decoding apparatus VDA5 according to the above-described fifth embodiment with the sequencer 10 and an underflow controller 24 added to the video decode controller CDV5 to form a video decode controller CDV6.

Figure 24:
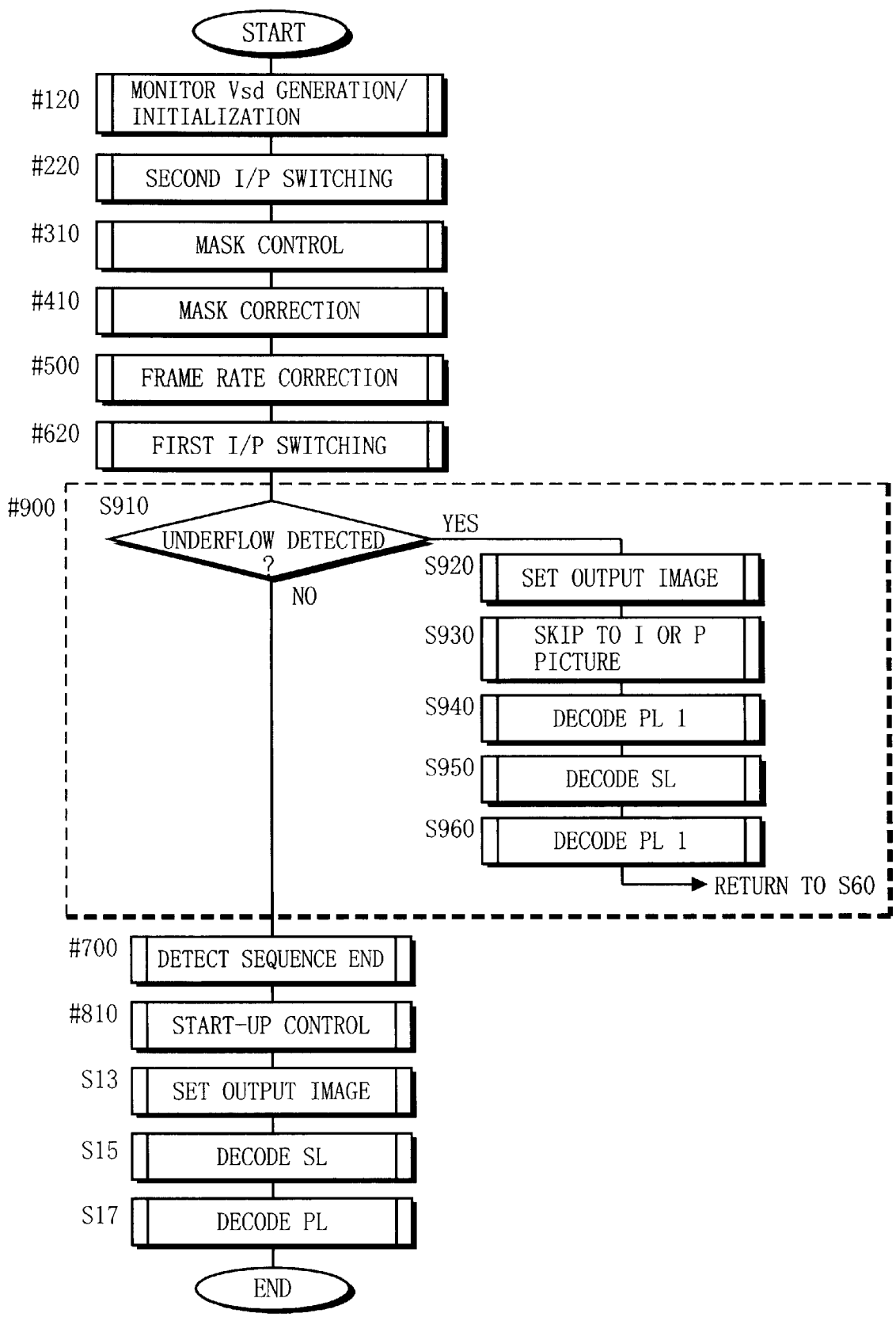
FIG. 24 is a flow chart showing the operation of the video stream seamless decoding apparatus shown in FIG. 23.

As shown in FIG. 24, a flow chart for the video decoding apparatus VDA6 is similar to the flow chart shown in FIG. 21 with an underflow control routine #900 newly inserted between the first I/P switching routine #620 and the sequence end detection routine #700.

The underflow control routine #900 consists of step S910 for determining whether underflow is detected, an output image setting routine S920, a routine S940 for skipping until an I picture or P picture is detected, a routine S940 for decoding the picture layer PL, a routine S950 for decoding the slice layer SL, a routine S960 for decoding the picture layer PL.

In step S910, if underflow is not detected, No is determined, and then the procedure goes to the sequence end detection routine #700. On the other hand, the output image setting is carried out in step S920.

Then, the input stream is searched until an I picture or P picture is found. If an I picture or P picture is found, the procedure goes to step S940.

In step S940, the picture layer PL is decoded. Then, the procedure goes to step S950.

In step S950, the slice layer SL is decoded.

Then, in step S960, the picture layer PL is decoded. Then, the procedure goes to step S60 in the Vsd generation/initialization routine #120 for the sleep process.

Figure 25:
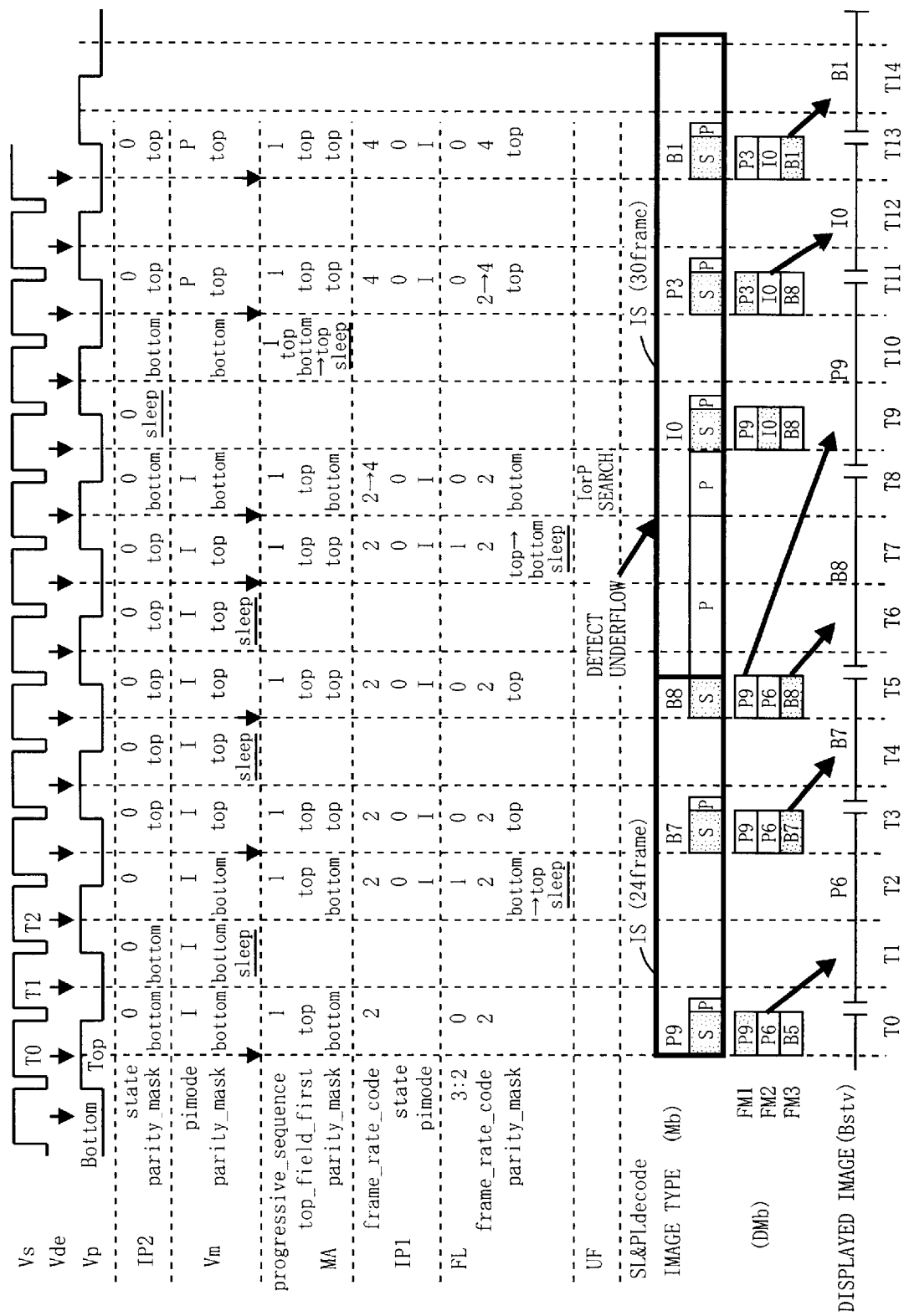
FIG. 25 is one timing chart showing timing of processing various signals observed in the video stream seamless decoding apparatus shown in FIG. 23.
Figure 26:
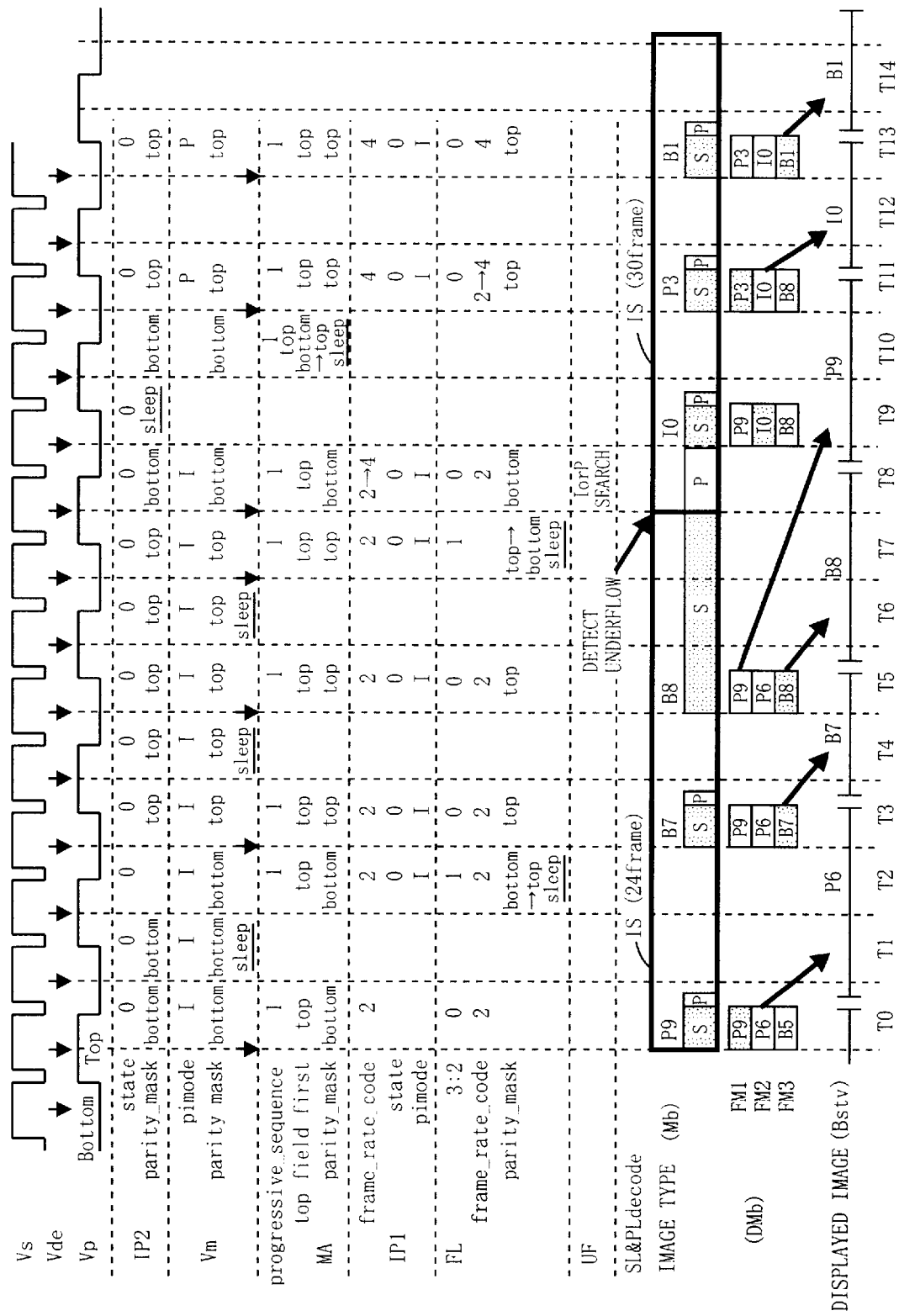
FIG. 26 is another timing chart showing timing of processing various signals observed in the video stream seamless decoding apparatus shown in FIG. 23, which is similar to FIG. 25.
Figure 27:
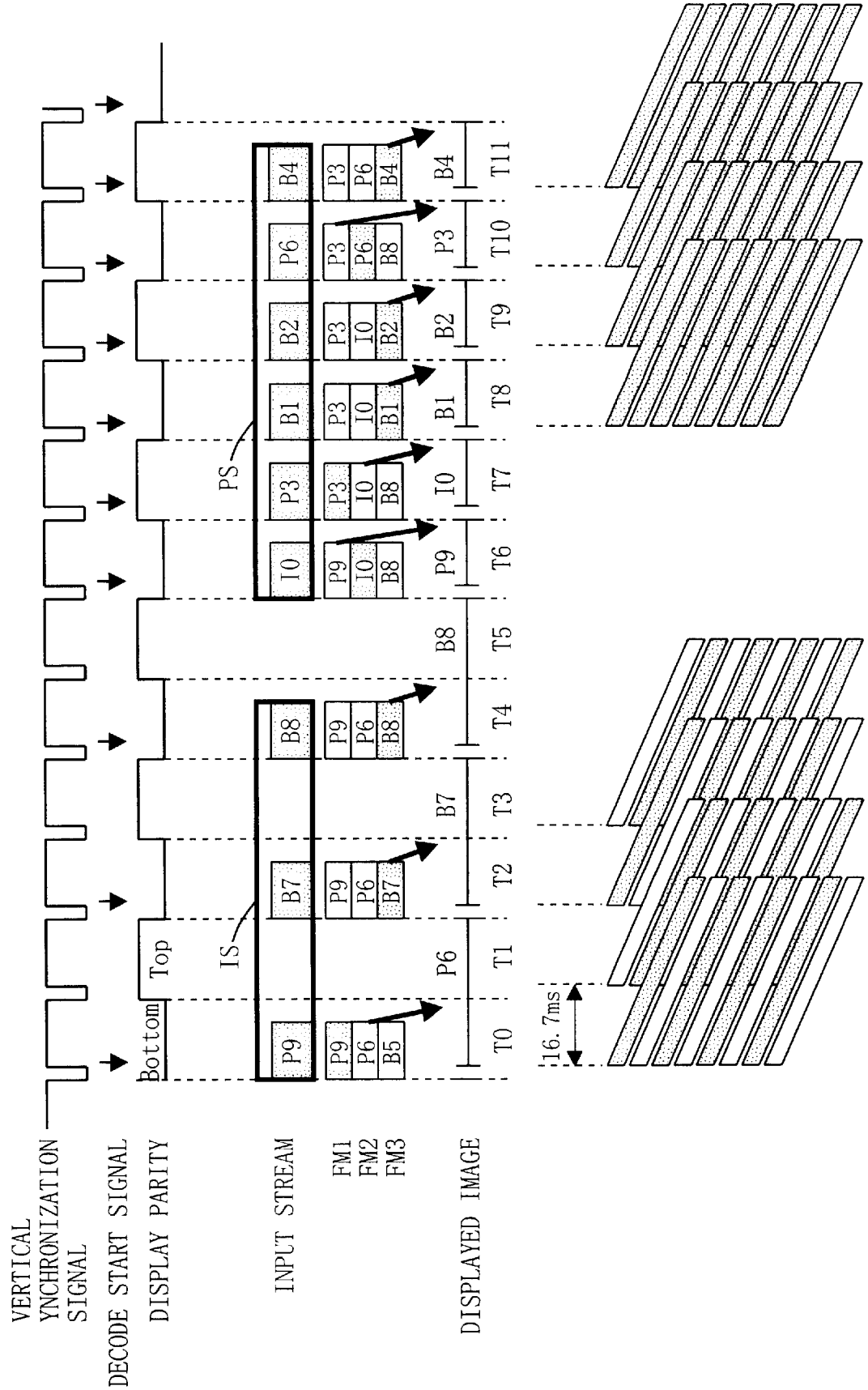
FIG. 27 is one timing chart representing timing of processing various signals observed at video stream decoding by a conventional video stream seamless decoding apparatus.
Figure 28:
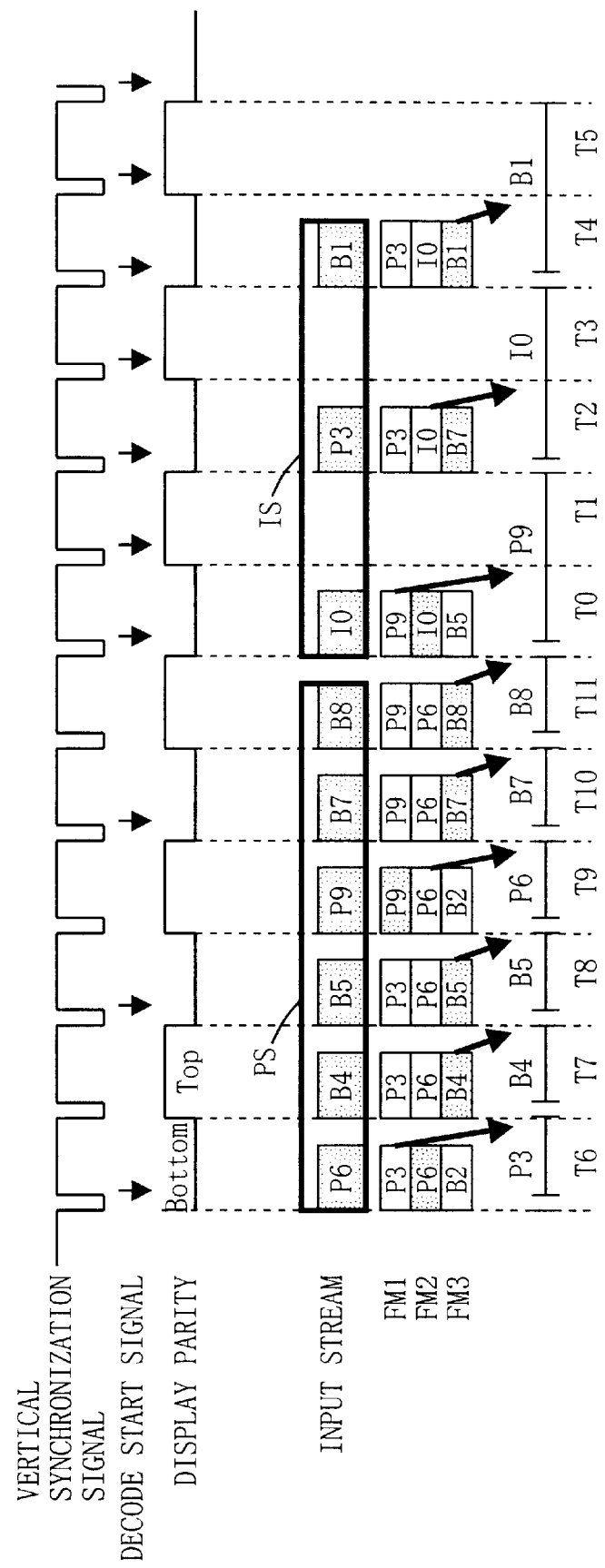
FIG. 28 is another timing chart representing timing of processing various signals observed at video stream decoding by the conventional video stream seamless decoding apparatus.

As a result of the above process, the decoding process of the present example is as shown in timing charts of FIGS. 25 and 26.

In FIGS. 25 and 26, cases where a stream arrives with delay to cause underflow when a 24P interlace stream IS for movie material is switched to a 30P interlace stream IS. Note that, shown in FIG. 25 is a case where the 30P interlace stream IS arrives with delay, while shown in FIG. 26 is a case where the slice layer SL of a B picture in the 24P interlace stream IS arrives with delay.

First, the case shown in FIG. 25 is considered. In the image display periods T0 to T5, the 3:2 pull-down process (T0 to T5) of the 24P interlace stream described for the fourth embodiment is shown. From the image display period T9 and thereafter, a process for the 30P interlace stream IS described for the first embodiment is shown.

In the periods T6 to T7, a case where a next stream is being detected is shown. That is, decoding of the slice layer SL of the B picture B8 started in the period T5 has not been completed over the periods T6 and T7, which means underflow is detected.

In the period T7, the 24P stream (P9) is supposedly displayed next. Therefore, the 3:2 pull-down process is still performed by the frame rate corrector.

In the period T8, the underflow controller 24 detects underflow, and searches for an I picture or P picture. Simultaneously, output image setting is performed for displaying the immediately-preceding decoded I picture or P picture. In the present example, the P picture P9 is displayed.

Over the end of the period T8 to the period T9, analysis of the I picture header ends, and the slice layer SL is decoded.

On the other hand, in the case shown in FIG. 26, decoding of the slice layer SL of the B8 picture is carried out in the periods T5 to T7, but the slice layer SL is not decoded to the last due to delay in stream arrival. That is, decoding of the picture layer PL of the I picture started in the period T5 has not yet been completed over the periods T6, T7, and T9, which means that underflow is detected.

In the period T8, when the underflow controller 24 detects underflow, decoding of the B8 picture is terminated, and searching for the next I picture or P picture is carried out. Simultaneously, output image setting is performed for displaying the immediately-preceding decoded I picture or P picture. In this case, analysis of the I picture header is completed at some point from the end of the period T8 to the period T9. Then, the slice layer SL is decoded.

Thus, smooth playback can be performed even when seamless playback of normal interlace streams IS, i.e., playback from 24P to 30P, is interrupted, that is, even when the stream is interrupted.

As stated above, in the present embodiment, searching for the next I picture or P picture starts when underflow is detected. If underflow occurs during decoding of the same stream, image playback interrupt time due to underflow can be minimized by finding the next P picture. This is because the P pictures P are densely arranged in the video stream STv, compared with the I pictures.

Also when the next picture is an I picture, image playback interrupt time due to underflow can be minimized. This is because, if the I picture is the first picture data after underflow occurs, there is no necessity to search for any P picture arranged after the I picture in time. Also, even if the video stream STv is, for example, a mixed stream comprised of the interlace streams IS and the progressive streams, or of the interlace streams that differ in frame rate, and underflow occurs immediately before switching between different streams, stream switching can be performed without any problem by finding any I picture.

INDUSTRIAL APPLICABILITY

As such, this invention can be effectively used for an apparatus that decodes digital broadcasting and digital contents recorded on a medium such as DVD.

What is claimed is:

1. A decoding apparatus for decoding a video stream comprised of a plurality of streams of different frame rates in predetermined decode timing for seamless playback, said apparatus comprising:

frame rate extracting means for extracting each of the frame rates before decoding the plurality of streams; and decode control means for determining timing for decoding a slice layer of the video stream based on the extracted frame rate, wherein seamless playback is possible by decoding the video stream in the determined decode timing even when the video stream is switched among streams of different frame rates, and wherein said decode means is operable to decode a slice layer of the compressed data and then to decode a picture layer of a following picture.

2. A decoding apparatus for decoding a video stream comprised of a plurality of streams of different frame rates in predetermined decode timing for seamless playback, said apparatus comprising:

frame rate extracting means for extracting each of the frame rates before decoding the plurality of streams; and decode control means for determining timing for decoding a slice layer of the video stream based on the extracted frame rate, wherein seamless playback is possible by decoding the video stream in the determined decode timing even when the video stream is switched among streams of different frame rates, wherein said frame rate extracting means is operable to analyze the video stream based on the decode timing, and to separate the video stream into header information and compressed data, wherein said decode control means is operable to delay, based on the header information, a vertical synchronization signal defined by a display format of the video stream for a predetermined time according to each of the frame rates of the plurality of streams included in the video stream, and to generate a decode timing signal for defining the decode timing, and wherein said decode control means includes, for the video stream, decode timing correcting means for alternately masking the decode timing signal for an interlace stream, and for outputting the decode timing signal as it is for a progressive stream.

3. The decoding apparatus as claimed in claim 2, wherein said decode control means is operable to mask the decode timing signal for completing display of the interlace stream when the video stream is changed from the interlace stream to the progressive stream.

4. The decoding apparatus as claimed in claim 2, wherein said decode control means is operable to prohibit masking of the decode timing signal, and to decode a first picture of the interlace stream that follows a last picture of the progressive stream when the video stream is changed from the progressive stream to the interlace stream.

5. The decoding apparatus as claimed in claim 2, wherein said decode control means is operable to:

set a multi-level transition parameter indicating a transition of the video stream to a first predetermined value when the video stream is not changed while decoded, set the transition parameter to a second predetermined value when the video stream is changed from the interlace stream to the progressive stream, that is, when frame_rate_code is changed from a value less than 7 to 7, set the transition parameter to a third predetermined value when the video stream is changed from the progressive stream to the interlace stream, that is, frame_rate_code is changed from 7 to a value less than 7, and set the transition parameter to the first predetermined value in next decode timing.

6. The decoding apparatus as claimed in claim 5, wherein said decode control means is operable to:

mask top_field of the decode timing signal when the video stream is the interlace stream and video display is carried out sequentially from top_field in accordance with video display parity, and mask bottom_field of the decode timing signal when video display is carried out sequentially from bottom_field in accordance with the video display parity.

7. The decoding apparatus as claimed in claim 6, wherein whether to mask top_field or bottom_field of the decode timing signal is defined by a binary mask signal parity_mask.

8. The decoding apparatus as claimed in claim 7, wherein said decode control means is operable to reverse parity_mask for parity correction when parity_mask is not equal to the video display parity and frame_rate_code is smaller than 7, and top_field_first is equal to the video display parity.

9. The decoding apparatus as claimed in claim 2, wherein when decoding starts, the decode control means sets a binary initial parameter defining an initial state of the decode control means to a first value.

10. The decoding apparatus as claimed in claim 9, wherein said decode control means is operable to decode a first picture of a following stream in order of the picture layer, the slice layer, and then the picture layer when the initial state parameter indicates the first value.

11. The decoding apparatus as claimed in claim 10, wherein the picture layer includes sequence_header, GOP_header, and Picture_header, wherein the slice layer includes a bit stream having slice_header, and wherein the picture layer and the slice layer form one image.

12. The decoding apparatus as claimed in claim 9, wherein said decode control means is operable to prohibit output image setting when the initial state parameter indicates the first value.

13. The decoding apparatus as claimed in claim 2, wherein when decoding starts, the decode control means is operable to execute a sleep process after setting the video stream to the progressive stream.

14. The decoding apparatus as claimed in claim 2, wherein said decode control means is operable to carry out frame rate correction at a time of a first transition of the video stream from a 24-frame interlace stream to either of a progressive stream or 30-frame interlace stream and at a time of a second transition of the video stream in reverse of the first transition, and set a binary parameter defining a parity of the stream from one value to another value for parity correction at a time of 3:2 pull-down.

15. The decoding apparatus as claimed in claim 14, wherein when underflow occurs at a B picture, said decode control means is operable to:

decode a picture layer and slice layer of a following I picture or P picture, and then a following picture layer, and then execute a sleep process.

16. The decoding apparatus as claimed in claim 2, wherein said decode control means is operable to:

end decoding when detecting sequence_end at a time of decoding the picture layer;

decode the picture layer, the slice layer, and then the picture layer, when detecting sequence_end of the video stream; and then to execute a sleep process.

17. The decoding apparatus as claimed in claim 2, wherein said decode control means is operable to make a previously-decoded I picture or P picture displayed at a time of underflow at which decoding in previous decode timing has been incomplete when another decode timing comes.

18. A decoding apparatus for decoding a video stream comprised of a plurality of streams of different frame rates in predetermined decode timing for seamless playback, said apparatus comprising:

frame rate extracting means for extracting each of the frame rates before decoding the plurality of streams; and decode control means for determining timing for decoding a slice layer of the video stream based on the extracted frame rate, wherein seamless playback is possible by decoding the video stream in the determined decode timing even when the video stream is switched among streams of different frame rates, and wherein said decode means is operable to decode a picture layer, a slice layer and then to further decode the picture layer.

* * * * *